(12) United States Patent
Ransom et al.

(10) Patent No.: US 7,188,003 B2
(45) Date of Patent: *Mar. 6, 2007

(54) SYSTEM AND METHOD FOR SECURING ENERGY MANAGEMENT SYSTEMS

(75) Inventors: Douglas S. Ransom, Victoria (CA); David A. Chivers, Victoria (CA); J. Bradford Forth, Victoria (CA); David W. Giles, Sidney (CA); Michael E. Teachman, Victoria (CA); Jeffrey W. Yeo, Saanichton (CA); Chuen Shan Simon Ki, Hong Kong (CN)

(73) Assignee: Power Measurement Ltd., Saanichton (CA)

( * ) Notice: Subject to any disclaimer, the term of this patent is extended or adjusted under 35 U.S.C. 154(b) by 84 days.
This patent is subject to a terminal disclaimer.

(21) Appl. No.: 10/752,467

(22) Filed: Jan. 5, 2004

(65) Prior Publication Data
US 2004/0193329 A1    Sep. 30, 2004

Related U.S. Application Data

(63) Continuation-in-part of application No. 09/723,564, filed on Nov. 28, 2000, now Pat. No. 6,961,641, which is a continuation-in-part of application No. 08/798,723, filed on Feb. 12, 1997, now abandoned, which is a continuation-in-part of application No. 08/369,849, filed on Dec. 30, 1994, now Pat. No. 5,650,936.

(60) Provisional application No. 60/459,182, filed on Mar. 31, 2003, provisional application No. 60/459,152, filed on Mar. 31, 2003.

(51) Int. Cl.
*G05D 11/00* (2006.01)

(52) U.S. Cl. .................. 700/286; 700/22; 700/291

(58) Field of Classification Search .................. 700/22, 700/286, 291–295, 297; 713/161, 170
See application file for complete search history.

(56) References Cited

U.S. PATENT DOCUMENTS 4,589,075 A    5/1986    Buennagel .................. 700/286
(Continued)

FOREIGN PATENT DOCUMENTS

WO    WO 00/42731    7/2000
(Continued)

OTHER PUBLICATIONS

PCT International Search Report for Application No. PCT/US04/23006.
(Continued)

*Primary Examiner*—Albert W. Paladini
*Assistant Examiner*—Alexander Kosowski
(74) *Attorney, Agent, or Firm*—Brinks Hofer Gilson & Lione

(57) ABSTRACT

A power management architecture for an electrical power distribution system, or portion thereof, is disclosed. The architecture includes multiple intelligent electronic devices ("IED's") distributed throughout the power distribution system to manage the flow and consumption of power from the system. The IED's are linked via a network to back-end servers. Power management application software and/or hardware components operate on the IED's and the back-end servers and inter-operate via the network to implement a power management application. The architecture provides a scalable and cost effective framework of hardware and software upon which such power management applications can operate to manage the distribution and consumption of electrical power by one or more utilities/suppliers and/or customers which provide and utilize the power distribution system. Security mechanisms are further provided which protect and otherwise ensure the authenticity of communications.

49 Claims, 17 Drawing Sheets

U.S. PATENT DOCUMENTS

| | | | |
|---|---|---|---|
| 4,641,248 A | 2/1987 | Suzuki et al. | 700/292 |
| 5,181,026 A | 1/1993 | Granville | |
| 5,448,229 A | 9/1995 | Lee, Jr. | 340/870.02 |
| 5,459,459 A | 10/1995 | Lee, Jr. | 340/870.02 |
| 5,477,216 A | 12/1995 | Lee, Jr. et al. | 340/870.02 |
| 5,495,239 A | 2/1996 | Ouellette | 340/870.02 |
| 5,517,423 A | 5/1996 | Pomatto | 700/286 |
| 5,563,506 A | 10/1996 | Fielden et al. | |
| 5,572,438 A | 11/1996 | Ehlers et al. | 700/285 |
| 5,576,700 A | 11/1996 | Davis et al. | 340/825.16 |
| 5,644,514 A | 7/1997 | Abo et al. | |
| 5,680,324 A | 10/1997 | Schweitzer, III et al. | |
| 5,684,466 A | 11/1997 | Keating et al. | |
| 5,699,276 A | 12/1997 | Roos | |
| 5,736,847 A | 4/1998 | Van Doorn et al. | 324/142 |
| 5,742,512 A | 4/1998 | Edge et al. | |
| 5,764,155 A | 6/1998 | Kertesz et al. | 340/825.08 |
| 5,862,325 A * | 1/1999 | Reed et al. | 709/201 |
| 5,862,391 A | 1/1999 | Salas et al. | 713/300 |
| 5,897,607 A | 4/1999 | Jenney et al. | 702/62 |
| 5,956,220 A | 9/1999 | Novosel et al. | |
| 6,005,759 A | 12/1999 | Hart et al. | 361/66 |
| 6,035,285 A | 3/2000 | Schlect et al. | 705/30 |
| 6,061,451 A | 5/2000 | Muratani et al. | |
| 6,088,659 A | 7/2000 | Kelley et al. | 702/62 |
| 6,112,304 A * | 8/2000 | Clawson | 713/156 |
| 6,118,269 A | 9/2000 | Davis | 324/110 |
| 6,167,389 A | 12/2000 | Davis et al. | 705/412 |
| 6,169,979 B1 | 1/2001 | Johnson | 705/412 |
| 6,178,362 B1 | 1/2001 | Woolard et al. | 700/295 |
| 6,259,972 B1 | 7/2001 | Sumic et al. | 700/286 |
| 6,263,313 B1 * | 7/2001 | Milsted et al. | 705/1 |
| 6,278,357 B1 | 8/2001 | Croushore et al. | |
| 6,285,917 B1 | 9/2001 | Sekiguchi et al. | |
| 6,313,752 B1 | 11/2001 | Corrigan et al. | 340/657 |
| 6,327,541 B1 | 12/2001 | Pitchford et al. | 702/62 |
| 6,535,797 B1 | 3/2003 | Bowles et al. | 700/286 |
| 6,549,880 B1 | 4/2003 | Willoughby et al. | 703/13 |
| 6,553,418 B1 | 4/2003 | Collins et al. | 709/224 |
| 6,633,823 B2 * | 10/2003 | Bartone et al. | 702/57 |
| 6,694,270 B2 | 2/2004 | Hart | |
| 2001/0002485 A1 * | 5/2001 | Bisbee et al. | 713/167 |
| 2001/0010032 A1 | 7/2001 | Ehlers et al. | 702/62 |
| 2001/0039537 A1 | 11/2001 | Carpenter et al. | 705/400 |
| 2002/0077729 A1 | 6/2002 | Anderson | 700/291 |
| 2002/0091784 A1 | 7/2002 | Baker et al. | 709/208 |
| 2002/0116550 A1 | 8/2002 | Hansen | 709/330 |
| 2002/0120685 A1 | 8/2002 | Srivastava et al. | 709/203 |
| 2002/0161536 A1 | 10/2002 | Suh et al. | 702/62 |
| 2003/0067725 A1 * | 4/2003 | Horvath et al. | 361/65 |
| 2003/0081790 A1 | 5/2003 | Kallahalla et al. | |
| 2003/0098679 A1 | 5/2003 | Odaohhara | |
| 2003/0110302 A1 | 6/2003 | Hodges et al. | |
| 2003/0158632 A1 * | 8/2003 | Nierlich et al. | 700/295 |
| 2003/0176952 A1 | 9/2003 | Collins et al. | 700/286 |

FOREIGN PATENT DOCUMENTS

| | | |
|---|---|---|
| WO | WO 01/33801 A2 | 5/2001 |
| WO | WO 03/107153 A2 | 12/2003 |
| WO | WO 03/107296 A2 | 12/2003 |
| WO | WO 03/107585 A1 | 12/2003 |

OTHER PUBLICATIONS

Dallas Semiconductor "About Maxim" information sheet, obtained Sep. 16, 2004 from http://www.maxim-iccom/company, 2 pages.

Dallas Semiconductor "DS2432™ 1k-Bit Protected 1-Wire EEPROM with SHA-1 Engine", product specifications, pp. 1-30.

Questra Applications Summary Data Sheet, pp. 1-2, Jul. 2, 2002.

Tridium™ Vykon™ Energy "JACE-401™" Product Data Sheet, pp. 1-2, Sep. 16, 2002.

Tridium™ Vykon™ Energy "Vykon Energy Profiler" Product Data Sheet, pp. 1-4, Oct. 16, 2001.

Schneider Electric Square D "Web-Enabled Power Management Solutions" brochure, pp. 1-8, Jan. 2002.

Tridium™ Vykon™ Building "Vykon™ Alarm Service" Product Data Sheet, pp. 1-2, Jun. 20, 2002.

Tridium™ Vykon™ Building "JACE-512™" Product Data Sheet, pp. 1-2, May 15, 2002.

Tridium™ Vykon™ Building "JACE-511™" Product Data Sheet, pp. 1-2, May 28, 2002.

Vykon™ By Tridium "JACE-NP-1®" Product Data Sheet, pp. 1-2, May 28, 2002.

Vykon™ By Tridium "WorkPlace Pro™" Product Data Sheet, pp. 1-2, Jan. 12, 2001.

Vykon™ Building "Web Supervisor™" Product Data Sheet, pp. 1-2, Nov. 30, 2001.

A8800-1 AcquiSuite Data Acquisition System specification, pp. 1-2, Sep. 24, 2001.

LiveData® Real-Time Data Management For Energy and Utility Companies brochure, pp. 1-4, © copyright 2002, Rev. Jan. 2002.

Tridium™ Vykon™ Energy "With the Right Tools Energy Costs are Controllable . . ." brochure, pp. 1-8, Nov. 1, 2001.

EnergyView™ "Energy Aggregation & Information System (EAIS) for Monitoring and Analysis of Electric and Gas Demand", selected pages from an EnergyView website http://66.64.38.69/energyview, pp. 1-4, Oct. 30, 2001.

Power Monitoring home page, obtained from http://www.parijat.com/Power_Monitoring.htm, Oct. 9, 2002, one page.

Press Release Aug. 24, 2000 "Connect One Announces Industry's First Wireless Chip to Connect Mobile Devices to the Internet", pp. 1-2.

Press Release, "Connect One and NAMS Create the World's First Dial-up Energy Meter that Sends and Receives E-Mail Without a Gateway", Sep. 5, 2000, pp. 1-2.

NAMS Metals by Nisko, NMM-AKB Specifications p. 1 of 1, Sep. 5, 2000.

Connect One "Automatic Meter Reading via the Internet", pp. 1-2. Jul. 11, 2001.

iModern™ "The Fastest Way to Internet-Enable any Device", pp. 1-3. Jul. 11, 2001.

ConnectOne™ Connecting your Device to the Internet™ iChip™ The Internet in your palm™, pp. 1-6. Jul. 11, 2001.

Engage Networks Launches Energy Management Venture, obtained at internet address http://www.engagenet.com/content/business_journal.shtml , Sep. 20, 2000. Appeared in Business Journal Feb. 11, 2000.

Engage Networks Inc. "D-Gen" Distributed Generation Management brochure, pp. 1-4. Link present as of Dec. 2, 1998 according to web archive at http://web.archive.org/web/19981205200934/www.engagenet.com/products.htm.

Engage Networks Inc. "Internet Protocol Card for Revenue Meters" brochure, pp. 1-2. Link present as of Mar. 3, 2000 on http://web.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1-2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

David W. Giles, "Direct-Access Metering Via the Web", 1998 CEA Conference, Toronto, Canada, pp. 1-19, © 1998 Power Measurement Ltd. Conference Apr. 27-29, 1998. Presented Apr. 29, 1998.

GE Industrial Systems "EnerVista.com" brochure, Sep. 2000.

Press release, Santa Clara, CA Sep. 25, 2000 "Connect One Reduces Time, Cost and Complexity to Connect Internet Appliances to Ethernet Lans", obtained at internet address http://www.connectone.com/html/prlsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicants believe this reference was published prior to Jan. 9, 2003.

Signature System™ Basics, obtained at internet address http://www.signaturesystem.com/sigbasics.html, Mar. 26, 2001. pp. 1-2.

Signature System™ InfoNodes, obtained at internet address http://www.signaturesystem.com/infonode.html, Mar. 26, 2001. pp. 1-2.

Questra A2B.Platform™ brochure, "Enabling conversation through universal connectivity", pp. 1-4, located at http://www.questra.com/h1_products/Questra_A2Bplatform. Applicants believe this reference was published prior to Jan. 9, 2003.

Questra A2B.Sales™ brochure, "Conversation to help you win", pp. 1-2, located at http://www.questra.com/h1_products/Questra_A2Bsales. Applicants believe this reference was published prior to Jan. 9, 2003.

Power Point Presentation: Presented at "Metering Europe 2000," Sep. 5-7, 2000, source http://www.energyict.com/fh/media/Presentation_Metering2000Munchen5.zip, pp. 1-37.

Brochure, RTU+Server, source http://www.energyict.com/fh/media/tru_plus_server.pdf, pp. 1-3, Apr. 6, 2001. Document archived at http://web.archive.org/web/20020702060538/http://www.energyict.com/fh/media/rtu_plus_server.pdf Feb. 7, 2001. Link present on http://web.archive.org/web/20010207201520/www.energyict.com/fa/en_ab_frame.htm on or before Feb. 7, 2001.

Brochure, EiServer, The Energy Information server, source http://www.energyict.com/fh/media/EiServer.pdf, pp. 1-7, Jul. 14, 2000. Link present on or before Feb. 7, 2001.

Advertisement, EiServer and RTU+Server, source, Metering International—2001 Issue 1, p. 19, publish date 1st Quarter 2001, p. 1.

Article, "Providing Tomorrow's Energy Management and Metering Tools Today," source, Metering International—2001 Issue 1, p. 18, publish date 1st Quarter 2001, p. 1.

"Email relating to the general technology of the application received from a competitor", from Erich W. Gunther [mailto:erich@electrotek.com] to Brad_Forth@pml.com sent May 9, 2001 3:36pm, pp. 1-2.

Electro Industries Press Release "Nexus 1250 High-Performance Power Monitor Gains Ethernet TCP/IP Capabilities," obtained at internet address http://www.electroindustries.com/feb5.html, Feb. 5, 2001 pp. 1-2.

Electro Industries "Nexus 1250 for Industry and Utilities," brochure, obtained at internet address http://www.electroindustries.com/pdf/nxsbrochure.pdf pp. 1-14 printed Jun. 1, 2001.

NetSilicon Solutions on Chip "NET+ARM™ Ethernet Processors" brochure, obtained at internet address http://www.netsilicon.com/EmbWeb/products/netarm.asp, pp. 1-2, Copyright © 2001 NetSilicon, Inc. Document archived http://web.archive.org/web/20010719171514/www.netsilicon.com/embweb/products/netarm.asp on Jul. 19, 2001.

EmWare® "Solutions Device Link," brochure, obtained at internet address http://www.emware.com/solutions/devicelink/, pp. 1-3, printed Jun. 1, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/, p. 1, © 2000-2001 iReady corporation, printed Jun. 1, 2001. First published as early as Mar. 1, 2001. http://web.archive.org/web/20010515202409/http://www.iready.com/ link on right side to "technology/index.html" captured Mar. 15, 2001.

muNet News & Events Press Releases "muNet makes cable industry debut with its WebGate™ Internet Residential and Commercial Information Systems, and HomeHeartBeat", http://www.munet.com, pp. 1-2, Dec. 15, 1999.

muNet News & Events Press Releases "muNet's WebGate™ Systems Finds a Home on the Internet!" http://www.munet.com, pp. 1-2, Mar. 18, 1999.

webGate™ IRIS Technology, products brochure pp. 1-9. Applicants believe this reference was published prior to Jan. 9, 2003.

MuNet News & Events Press Release "muNet Demonstrates End-to-Enc IP-Based Energy Management System at DistribuTECH," Feb. 5, 2000, pp. 1-2.

WebGate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

WebGate™ ICIS™ "Internet Commercial Information System," p. 1 of 1 Published in Energy IT Nov./Dec. 2000 Technology Info Center. See http://www.platts.com/infotech/issues/0011/eittic0011.shtml for this reference—search for munet.com.

F. Momal, C. Pinto-Pereira, "Using World-Wide-Web for Control Systems" Abstract, AT Division CERN, 1211 Geneva 23, 6 pages. Published 1995.

P. M. Corcoran, J. Desbonnet and K. Lusted "THPM 14.2 CEBus Network Access via the World-Wide-Web" Abstract, © 1996 IEEE, pp. 236 & 237.

ATI Systems, "Technical Overview Ethernet SCAN II™ Module" specification, Oct. 1994, 2 pages.

J. Hofman, "The Consumer Electronic Bus: An Integrated Multi-Media LAN for the Home", International Journal of Digital and Analog Communication Systems, vol. 4, 77-86 (1991), © 1991 by John Wiley & Sons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 "TECO & IBM—The "Smart House" Is Here" Press release, obtained at http://filebox.vt.edu/users/mikemike/smart-house/infotrac/article4.txt, Jul. 11, 2002, pp. 1&2.

Distributed.Net, http://n0cgi.distributed.net/faq/cache/178.html, printed Jun. 10, 2003. Link archived at http://web.archive.org/web/20000901052607/n0cgi.distributed.net/faq/cache/178.html on Sep. 1, 2000.

Questra, Security overview, obtained http://www.questra.com/products/security.asp, printed Jun. 10, 2003. 2 pages. Applicants believe this reference was published prior to Jan. 9, 2003.

Questra Mastering Smart Security brochure, 2 pages Copyright 2002 Questra Corporation, obtained http://www.questra.com/collateral/collateral_files/SecurityOverview.pdf, printed Jun. 10, 2003. Applicants believe this reference was published prior to Jan. 9, 2003.

Questra Total Access brochure, 2 pages, Copyright 2003 Questra Corporation, obtained http://www.questra.com/collateral/collateral_files/TotalAccess.pdf, printed Jun. 10, 2003. Applicants believe this reference was published prior to Jan. 9, 2003.

Axeda DRM System Overview, 2 pages, obtained http://www.axeda.com/solutions/overview.html, printed Jun. 9, 2003. Applicants believe this reference was published prior to Jan. 9, 2003.

Axeda Access, 3 pages, obtained http://www.axeda.com/solutions/portals/portal_access.html, printed Jun. 9, 2003. Applicants believe this reference was published prior to Jan. 9, 2003.

Axeda DRM Technology Overview, 1 page, obtained http://www.axeda.com/solutions/tech_challenges/firewallfriendly.html, printed Jun. 9, 2003. Applicants believe this reference was published prior to Jan. 9, 2003.

Axeda DRM Technology Overview, 1 page, obtained http://www.axeda.com/solutions/tech_challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.

Axeda Solutions for Industry, 1 page, obtained http://www.axeda.com/solutions/industries/industrial.html, printed Jun. 9, 2003. Archived at http://web.archive.org/web/20020221165907/http://axeda.com/industries/industrial.html on Feb. 21, 2002.

Axeda Agents, 2 pages, obtained http://www.axeda.com/solutions/device_servers/index.html, printed Jun. 9, 2003. Applicants believe this reference was published prior to Jan. 9, 2003.

Axeda Case Studies, "Axeda Prevents Power Failures at a Leading Microprocessor Plant in Israel", 2 pages, obtained http://www.axeda.com/industies/casestudies_microprocessor.html, printed Jun. 9, 2003. Applicants believe this reference was published prior to Jan. 9, 2003.

David Mueller and Sandy Smith, Electrotek Concepts, "Using Web-based Power Quality Monitoring for Problem Solving and Improving Customer Relations", proceedings of the 4th Annual Latin American Power 99 Conference, Jun. 29, 1999, pp. 263-271.

"High-Security SCADA LDRD Final Report", Rolf Carlson, Apr. 2002, pp. 1-20, XP002375457, Albuquerque, New Mexico, Livermore, California, URL:www.sandia.gov/scada/documents/020729.

Paul Daigle, "All-Electronic Power and Energy Meters," Analog Dialogue 33-2 (1999 Analog Devices).

"Advanced Utility Metering, Period of Performance: Apr. 23, 2002-Sep. 22, 2002," Architectural Energy Corp. at Boulder Colorado, National Renewable Energy Laboratory, published Sep. 2003.

"Security and Encryption for AMR Communications" presentation at Transmission, Distribution and Metering Conference Apr. 21-24, 2002 at Dallas, Texas by SmartSynch Inc.

Product brochure, S4 IDR SmartMeter by Itron, copyright 2003.

"A Case Study Review of Technical and Technology Issues for Transition of a Utility Load Management Program to Provide System Reliability Resources in Restructured Electrictiy Markets" by G.H. Weller of Weller Associates under contract to Southern California Edison, dated Jul. 2001.

* cited by examiner

FIG. 11

| Site1.a8500 | Default Diagram |
|---|---|
| LABEL | VALUE |
| I a | 197.97 |
| I b | 207.52 |
| I c | 237.82 |
| Vln c | 479.28 |
| Vln b | 371.46 |
| Vll ca | 580.46 |
| Vll ab | 589.1 |
| Vll bc | 586.28 |
| Vll avg | 585.28 |
| Vln avg | 357.23 |
| I avg | 214.44 |
| PF sign tot | -94 |
| Freq | 59 |
| CL1 LocalTime | 08:32.9 |

Change Update Rate
Type in the number of seconds you would like between page updates and hit <RETURN>    10

Some features to implement:
Auto-detection: Excel could automatically add a worksheet (a "tab" below) when it detects a new device on the network
Complex Aggregation: Because it is Excel, you can do anything you want, easily
Logging: You could write simple scripts to log the values on the left to an Access DB
Animation: Charts, warnings, etc
Onboard logs could be displayed easily
Default diagrams: we just need to create an excel template for each device

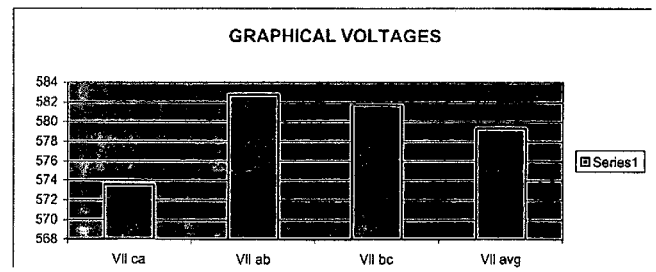

Sum of Currents:            643.31

Formula-based Setpoint:     OVER 550 Volts

SYSTEM AND METHOD FOR SECURING ENERGY MANAGEMENT SYSTEMS

This application is also a continuation-in-part under 37 C.F.R. § 1.53(b) of U.S. patent application Ser. No. 09/723,564 filed Nov. 28, 2000 now U.S. Pat. No. 6,961,641, issued on Nov. 1, 2005, the entire disclosure of which is hereby incorporated by reference. U.S. patent application Ser. No. 09/723,564 is a continuation-in-part under 37 C.F.R. § 1.53(b) of U.S. patent application Ser. No. 08/798,723 filed Feb. 12, 1997, abandoned, the entire disclosure of which is hereby incorporated by reference, which is a continuation-in-part under 37 C.F.R. § 1.53(b) of U.S. patent application Ser. No. 08/369,849 filed Dec. 30, 1994 now U.S. Pat. No. 5,650,936, the entire disclosure of which was incorporated by reference.

REFERENCE TO RELATED APPLICATIONS

This application claims the benefit of the filing date under 35 U.S.C. § 119(e) of U.S. Provisional Application Ser. No. 60/459,182 filed Mar. 31, 2003, which is hereby incorporated by reference, and U.S. Provisional Application Ser. No. 60/459,152 filed Mar. 31, 2003, which is hereby incorporated by reference.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of energy per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

The requirements of increased demand and higher reliability are burdening an already overtaxed distribution network and forcing utilities to invest in infrastructure improvements at a time when the deregulated competitive market is forcing them to cut costs and lower prices. Accordingly, there is a need for a system of managing the distribution and consumption of electrical power which meets the increased demands of users and allows the utility supplier to compete in a deregulated competitive marketplace.

BRIEF DESCRIPTION OF THE DRAWINGS

FIG. 11 illustrates an exemplary display generated by the embodiment of FIG. 10.

DETAILED DESCRIPTION OF THE DRAWINGS AND PRESENTLY PREFERRED EMBODIMENTS

Figure 1:
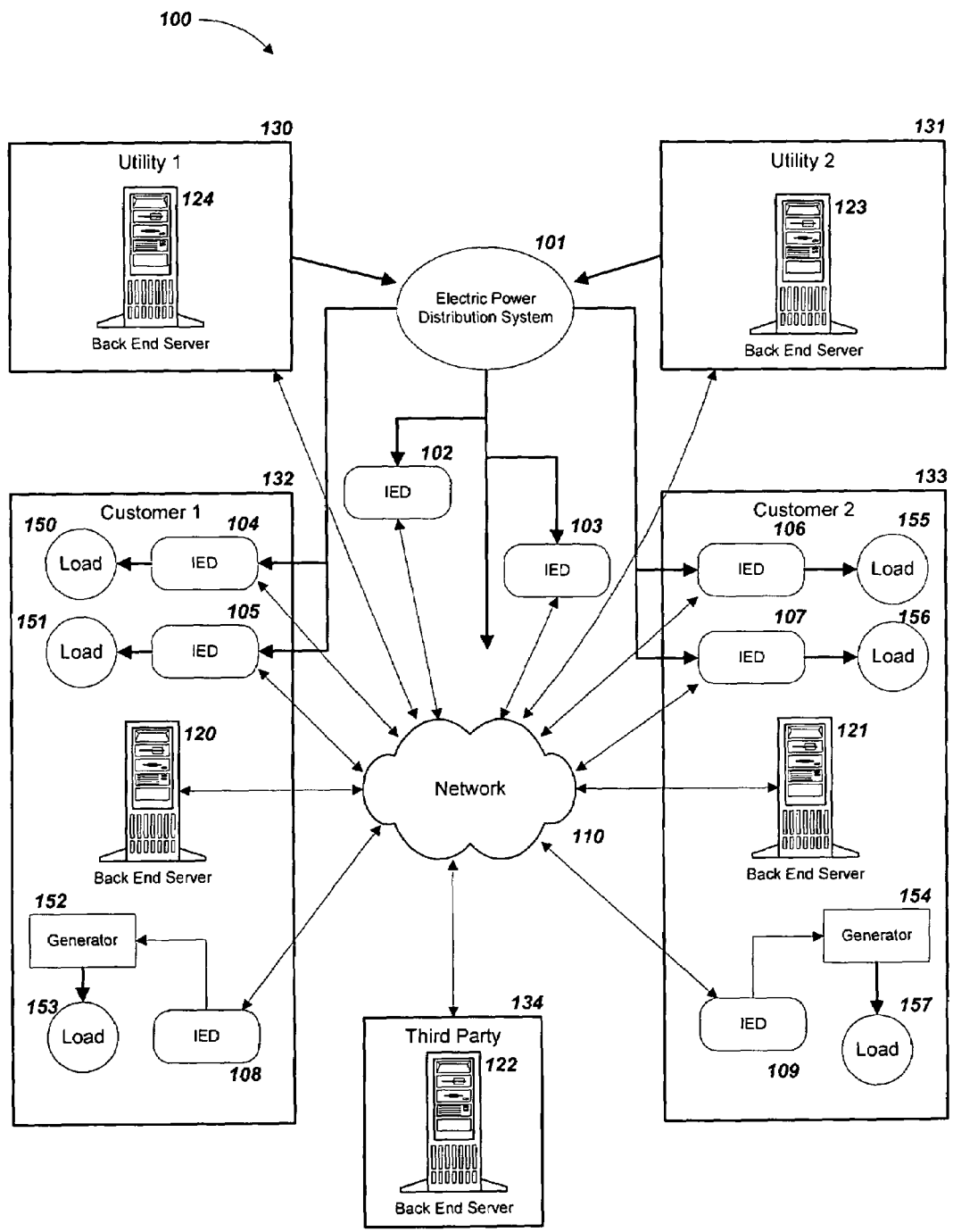
FIG. 1 illustrates a first embodiment of the Power Management Architecture.

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes the ability to communicate with remote computing systems, either via a direct connection, e.g. modem or via a network. For more detailed information regarding IED's capable of network communication, please refer to U.S. patent application Ser. No. 08/798,723, captioned above. In particular, the monitoring of electrical power, especially the measuring and calculating of electrical parameters, provides valuable information for power utilities and their customers. Monitoring of electrical power is important to ensure that the electrical power is effectively and efficiently generated, distributed and utilized. Various different arrangements are presently available for monitoring, measuring, and controlling power parameters. Typically, an IED, such as an individual power measuring device, is placed on a given branch or line proximate to-one or more loads which are coupled with the branch or line in order to measure/monitor power system parameters. Herein, the phrase "coupled with" is defined to mean directly connected to or indirectly connected with through one or more intermediate components. Such intermediate components may include both hardware and software based components. In addition to monitoring power parameters of a certain load(s), such power monitoring devices have a variety of other applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's/power measuring devices individually dial-in to a central SCADA computer system via a modem. However, such dial-in systems are limited by the number of inbound telephone lines to the SCADA computer and the availability of phone service access to the IED/power measuring devices. With a limited number of inbound telephone lines, the number of IED's/ power measuring devices that can simultaneously report their data is limited resulting in limited data throughput and delayed reporting. Further, while cellular based modems and cellular system access are widely available, providing a large number of power measuring devices with phone service is cumbersome and often cost prohibitive. The overall result is a system that is not easily scalable to handle a large number of IED's/power measuring devices or the increased bandwidth and throughput requirements of advanced power management applications. However, the ability to use a computer network infrastructure, such as the Internet, allows for the use of power parameter and data transmission and reporting on a large scale. The Internet provides a connectionless point to point communications medium that is capable of supporting substantially simultaneous communications among a large number of devices. For example this existing Internet infrastructure can be used to simultaneously push out billing, load profile, or power quality data to a large number of IED/power measurement and control devices located throughout a power distribution system that can be used by those devices to analyze or make intelligent decisions based on power consumption at their locations. The bandwidth and throughput capabilities of the Internet supports the additional requirements of advanced power management applications. For example, billing data, or other certified revenue data, must be transferred through a secure process which prevents unauthorized access to the data and ensures receipt of the data by the appropriate device or entity. Utilizing the Internet, communications can be encrypted such as by using encrypted email. Further, encryption authentication parameters such as time/date stamp or the IED serial number, can be employed. Within the Internet, there are many other types of communications applications that may be employed to facilitate the above described inter-device communications such as email, Telnet, file transfer protocol ("FTP"), trivial file transfer protocol ("TFTP") or proprietary systems, both unsecured and secure/encrypted.

As used herein, Intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is designed as an industrial control system. An exemplary PLC is the SLC 500 Series, manufactured by Allen-Bradley in Milwaukee, Wis.

A meter, is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses or monitors the pulse output of the meter. An exemplary electromechanical meter is the AB1 Meter manufactured by ABB in Raleigh, N.C. Such conversion devices are known in the art.

The disclosed embodiments relate to a communications architecture that can be used for monitoring, protection and control of devices and electrical power distribution in an electrical power distribution system, where IED's can interact with other IED's and attached devices.

As will be described in more detail below, a power management architecture for an electrical power distribution system, or portion thereof, is disclosed. The architecture provides a scalable and cost effective framework of hardware and software upon which power management applications can operate to manage the distribution and consumption of electrical power by one or more utilities/suppliers and/or customers which provide and utilize the power distribution system.

Power management applications include automated meter reading applications, load shedding applications, deregulated supplier management applications, on-site power generation management applications, power quality management applications, protection/safety applications, and general distribution system management applications, such as equipment inventory and maintenance applications. A power management application typically includes one or more application components which utilize the power management architecture to interoperate and communicate thereby implementing the power management application.

The architecture includes Intelligent Electronic Devices ("IED's") distributed throughout the power distribution system to monitor and control the flow of electrical power. IED's may be positioned along the supplier's distribution path or within a customer's internal distribution system. IED's include revenue electric watt-hour meters, protection relays, programmable logic controllers, remote terminal units, fault recorders and other devices used to monitor and/or control electrical power distribution and consumption. As was noted, IED's also include legacy mechanical or electromechanical devices which have been retrofitted with appropriate hardware and/or software so as to be able to integrate with the power management architecture. Typically an IED is associated with a particular load or set of loads which are drawing electrical power from the power distribution system. As was described above, the IED may also be capable of receiving data from or controlling its associated load. Depending on the type of IED and the type of load it may be associated with, the IED implements a power management function such as measuring power consumption, controlling power distribution such as a relay function, monitoring power quality, measuring power parameters such as phasor components, voltage or current, controlling power generation facilities, or combinations thereof. For functions which produce data or other results, the IED can push the data onto the network to another IED or back end server, automatically or event driven, (discussed in more detail below) or the IED can wait for a polling communication which requests that the data be transmitted to the requester.

In addition, the IED is also capable of implementing an application component of a power management application utilizing the architecture. As was described above and further described below, the power management application includes power management application components which are implemented on different portions of the power management architecture and communicate with one another via the architecture network. The operation of the power management application components and their interactions/communications implement the power management application. One or more power management applications may be utilizing the architecture at any given time and therefore, the IED may implement one or more power management application components at any given time.

The architecture further includes a communications network. Preferably, the communication network is a publicly accessible data network such as the Internet or other network or combination of sub-networks that transmit data utilizing the transport control protocol/internet protocol ("TCP/IP") protocol suite. Such networks include private intranet networks, virtual private networks, extranets or combinations thereof and combinations which include the Internet. Alternatively, other communications network architectures may also be used. Each IED preferably includes the software and/or hardware necessary to facilitate communications over the communications network by the hardware and/or software which implements the power management functions and power management application components. In alternative embodiments, quality of service protocols can be implemented to guarantee timely data delivery, especially in real time applications.

The hardware and/or software which facilitate network communications preferably includes a communications protocol stack which provides a standard interface to which the power management functions hardware/software and power management application components hardware/software interact. As will be discussed in more detail below, in one embodiment, the communications protocol stack is a layered architecture of software components. In the preferred embodiments these layers or software components include an applications layer, a transport layer, a routing layer, a switching layer and an interface layer.

The applications layer includes the software which implements the power management functions and the power management applications components. Further, the applications layer also includes the communication software applications which support the available methods of network communications. Typically, the power management function software interacts with the power management hardware to monitor and or control the portion of the power distribution system and/or the load coupled with the IED. The application component typically interacts with the power management function software to control the power management function or process data monitored by the power management function. One or both of the power management function software and the power management application component software interacts with the communication software applications in order to communicate over the network with other devices.

The communications applications include electronic mail client applications such as applications which support Simple Mail Transfer Protocol ("SMTP"), Multipurpose Internet Mail Extensions ("MIME") or Post Office Protocol ("POP") network communications protocols, security client applications such as encryption/decryption or authentication applications such as secure-HTTP or secure sockets layer ("SSL"), or other clients which support standard network communications protocols such as telnet, hypertext transport protocol ("HTTP"), file transfer protocol ("FTP"), network news transfer protocol ("NNTP"), instant messaging client applications, or combinations thereof. Other client application protocols include extensible markup language ("XML") client protocol and associated protocols such as Simple Object Access Protocol ("SOAP"). Further, the communications applications could also include client applications which support peer to peer communications. All of the communications applications preferably include the ability to communicate via the security client applications to secure the communications transmitted via the network from unauthorized access and to ensure that received communications are authentic, uncompromised and received by the intended recipient. Further, the communications applications include the ability to for redundant operation through the use of one or more interface layer components (discussed in more detail below), error detection and correction and the ability to communicate through firewalls or similar private network protection devices.

The transport layer interfaces the applications layer to the routing layer and accepts communications from the applications layer that are to be transmitted over the network. The transport layer breaks up the communications layer into one or more packets, augments each packet with sequencing data and addressing data and hands each packet to the routing layer. Similarly, packets which are received from the network are reassembled by the transport layer and the reconstructed communications are then handed up to the applications layer and the appropriate communications applications client. The transport layer also ensures that all packets which make up a given transmission are sent or received by the intended destination. Missing or damaged packets are re-requested by the transport layer from the source of the communication. In the preferred embodiment, the transport layer implements the transport control protocol ("TCP").

The routing layer interfaces the transport layer to the switching layer. The routing layer routes each packet received from the transport layer over the network. The routing layer augments each packet with the source and destination address information. In the preferred embodiment, the routing layer implements the internet protocol ("IP"). It will be appreciated that the TCP/IP protocols implement a connectionless packet switching network which facilitates scalable substantially simultaneous communications among multiple devices.

The switching layer interfaces the routing layer to the interface layer. The switching layer and interface layer are typically integrated. The interface layer comprises the actual hardware interface to the network. The interface layer may include an Ethernet interface, a modem, such as wired modem using the serial line interface protocol ("SLIP") or point to point protocol ("PPP"), wired modem which may be an analog or digital modem such as a integrated services digital network ("ISDN") modem or digital subscriber line ("DSL") modem, or a cellular modem. Further, other wireless interfaces, such as Bluetooth, may also be used. In addition, AC power line data network interface may also be used. Cellular modems further provide the functionality to determine the geographic location of the IED using cellular RF triangulation. Such location information can be transmitted along with other power management data as one factor used in authenticating the transmitted data. In the preferred embodiments, the interface layer provided allows for redundant communication capabilities. The interface layer couples the IED with a local area network, such as provided at the customer or utility site. Alternatively, the interface layer can couple the IED with a point of presence provided by a local network provider such as an internet service provider ("ISP").

Finally, the architecture includes back-end server computers or data collection devices. Back end servers may be provided by the consumer of electric power, the utility supplier of electric power or a third party. In one embodiment, these devices are IED's themselves. The back end servers are also coupled with the network in a same way as the IED's and may also include a communication protocol stack. The back end servers also implement power management applications components. which interact and communicate with the power management application components on the IED's to accomplish the power management application. Preferably, the IED's are programmed with the network addresses of the appropriate back end servers or are capable of probing the network for back end servers to communicate with. Similarly, the back end server is programmed with the network addresses of one or more affiliate IED's or is capable of probing the network to find IED's that are connected. In either case of network probing by the IED or back-end server, software and/or hardware is provided to ensure that back-end servers communicate with authorized IED's and vice versa allowing multiple customers and multiple suppliers to utilize the architecture for various power management applications without interfering with each other.

The back end servers preferably are executing software application counterparts to the application clients and protocols operating on the IED's such as electronic mail, HTTP, FTP, telnet, NNTP or XML servers which are designed to receive and process communications from the IED's. Exemplary server communications applications include Microsoft Exchange™. The back end server is therefore capable of communicating, substantially simultaneously, with multiple IED's at any given time. Further, the back end server implements a security application which decrypts and/or authenticates communications received from IED's and encrypts communications sent to IED's.

In one embodiment, software executing on the back end server receives communications from an IED and automatically extracts the data from the communication. The data is automatically fed to a power management application component, such as a billing management component.

In this way, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As used herein, an IED or PMD is a power management device capable of network communication. A back end server is a data collection or central command device coupled with the network which receives power management data from an IED and/or generates power management commands to and IED. An IED may contain a back-end server. The network is any communications network which supports the Transport Control Protocol/Internet Protocol ("TCP/IP") network protocol suite. In the preferred embodiment IED's include devices such as PLC's, RTU's, meters, protection relays, fault recorders or modified electromechanical devices and further include any device which is coupled with an electrical power distribution network, or portion thereof, for the purpose of managing or controlling the distribution or consumption of electrical power.

FIG. 1 illustrates an overview of the preferred embodiment of the Power Management Architecture ("architecture") 100, which contains one or more IED's 102, 103, 104, 105, 106, 107, 108, 109. The IED's 102–109 are connected to an electrical power distribution system 101, or portion thereof, to measure, monitor and control quality, distribution and consumption of electric power from the system 101, or portion thereof. The power distribution system is typically owned by either a utility/supplier or consumer of electric power however some components may be owned and/or leased from third parties. The IED's 102–109 are further interconnected with each other and back end servers 120, 121, 122, 123, 124 via a network 110 to implement a Power Management Application ("application") 211. In the preferred embodiment, the network 110 is the Internet. Alternatively, the network 110 can be a private or public intranet, an extranet or combinations thereof, or any network utilizing the Transport Control Protocol/Internet Protocol ("TCP/IP") network protocol suite to enable communications, including IP tunneling protocols such as those which allow virtual private networks coupling multiple intranets or extranets together via the Internet. The network 110 may also include portions or sub-networks which use wireless technology to enable communications, such as RF, cellular or Bluetooth technologies. The network 110 preferably supports application protocols such as telnet, FTP, POP3, SMTP, NNTP, Mime, HTTP, SMTP, SNNP, IMAP, proprietary protocols or other network application protocols as are known in the art as well as transport protocols SLIP, PPP, TCP/IP and other transport protocols known in the art.

The Power Management Application 211 utilizes the architecture 100 and comprises power management application components which implement the particular power management functions required by the application 211. The power management application components are located on the IED 102–109 or on the back end server 121–124, or combinations thereof, and can be a client component, a server component or a peer component. Application components communicate with one another over the architecture 100 to implement the power management application 211.

In one preferred embodiment the architecture 100 comprises IED's 102–109 connected via a network 110 and back end servers 120, 121, 122, 123, 124 which further comprise software which utilizes protocol stacks to communicate. IED's 102–109 can be owned and operated by utilities/suppliers 130, 131, consumers 132 133 or third parties 134 or combinations thereof. Back end servers 120 121 122 123 124 can be owned by utilities/suppliers 130, 131, consumers 132, 133, third parties 134 or combinations thereof. For example, an IED 102–109 is operable to communicate directly over the network with the consumer back-end server 120, 121, another IED 102–109 or a utility back end server 123,124. In another example, a utility back end server 123, 124 is operable to connect and communicate directly with customer back end servers 120, 121. Further explanation and examples on the types of data and communication between IED's 102–109 are given in more detail below.

Furthermore, the architecture's 100 devices, such as the back end servers 120–124 or IED's 102–109, can contain an email server and associated communications hardware and software such as encryption and decryption software. Other transfer protocols, such as file transfer protocols (FTP), Simple Object Access Protocol (SOAP), HTTP, XML or other protocols know in the art may also be used in place of electronic mail. Hypertext Transfer Protocol (HTTP) is an application protocol that allows transfer of files to devices connected to the network. FTP is a standard internet protocol that allows exchange of files between devices connected on a network. Extensible markup language (XML) is a file format similar to HTML that allows transfer of data on networks. XML is a flexible, self describing, vendor-neutral way to create common information formats and share both the format and the data over the connection. In the preferred embodiment the data collection server is operable by either the supplier/utility 130, 131 or the customer 132, 133 of the electrical power distribution system 101. SOAP allows a program running one kind of operating system to communicate with the same kind, or another kind of operating system, by using HTTP and XML as mechanisms for the information exchange.

Furthermore, the application 111 includes an authentication and encryption component which encrypts commands transmitted across the network 110, and decrypts power management data received over the network 110. Authentication is also performed for commands or data sent or received over the network 110. Authentication is the process of determining and verifying whether the IED 102–109 transmitting data or receiving commands is the IED 102–109 it declares itself to be and in the preferred embodiment authentication includes parameters such as time/date stamps, digital certificates, physical locating algorithms such as cellular triangulation, serial or tracking ID's, which could include geographic location such as longitude and latitude. Authentication prevents fraudulent substitution of IED 102–109 devices or spoofing of IED 102–109 data generation in an attempt to defraud. Authentication also minimizes data collection and power distribution system 101 control errors by verifying that data is being generated and commands are being received by the appropriate devices. In the preferred embodiment encryption is done utilizing Pretty Good Privacy (PGP). PGP uses a variation of public key system, where each user has a publicly known encryption key and a private key known only to that user. The public key system and infrastructure enables users of unsecured networks, such as the internet, to securely and privately exchange data through the use of public and private cryptographic key pairs.

In the preferred embodiment the architecture is connectionless which allows for substantially simultaneous communications between a substantial number of IED's within the architecture. This form of scalability eclipses the current architectures that utilize point to point connections, such as provided by telephony networks, between devices to enable communications which limit the number of simultaneous communications that may take place.

Figure 2A:
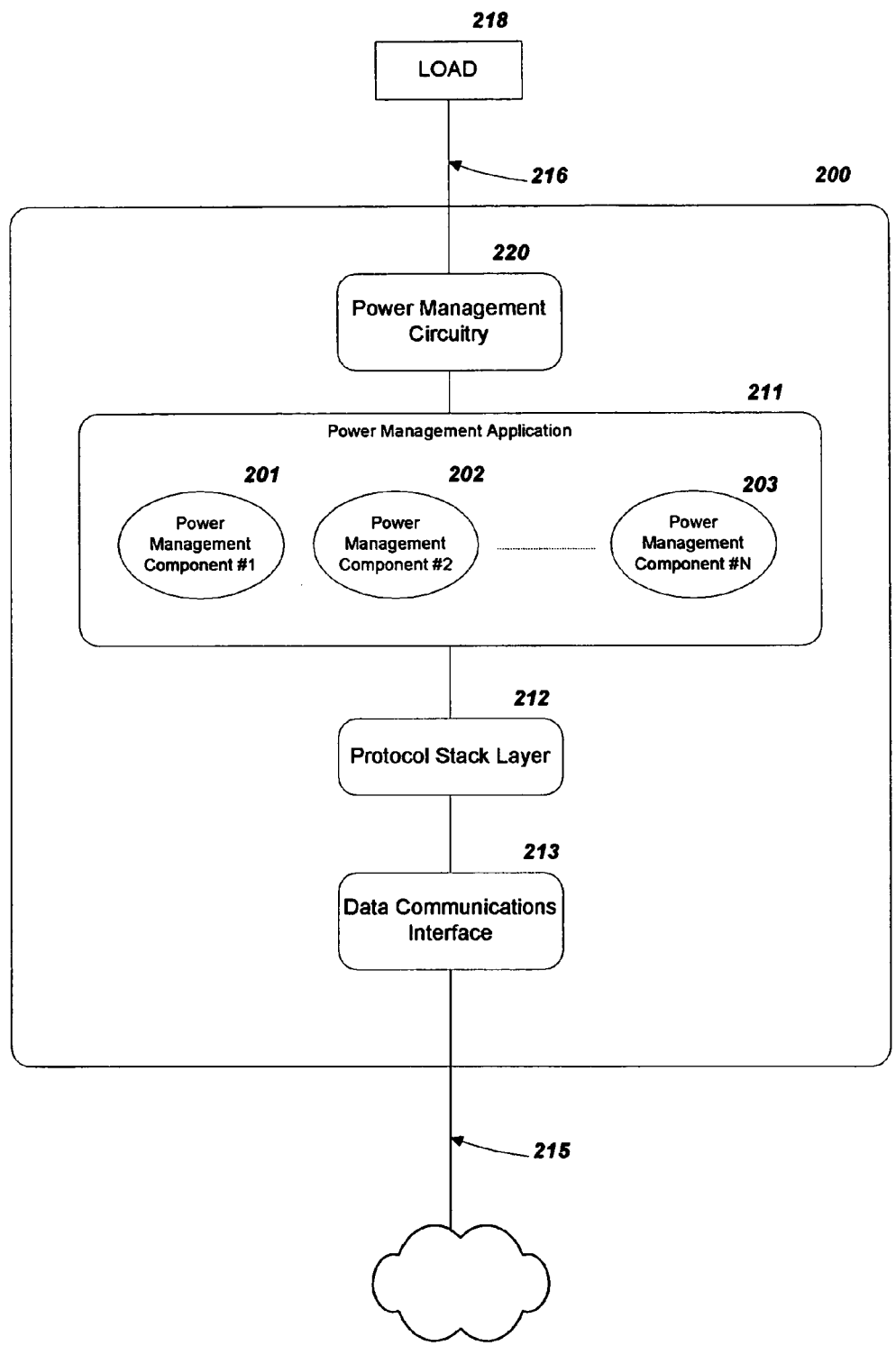
FIG. 2a illustrates an IED, for use with the embodiment of FIG. 1, containing several power management components.

FIG. 2a illustrates a preferred embodiment where and IED 200 contains several power management components 201 202 203 and power management circuitry 220. The power management circuitry 220 is operable to implement the IED's functionality, such as metering/measuring power delivered to the load 218 from the electrical power distribution system 216, measuring and monitoring power quality, implementing a protection relay function, or other functionality of the IED 200. The IED 200 further includes a power management application components 211 coupled with the circuitry 220 and a protocol stack 212 and data communication interface 213. The protocol stack 212 and data communications interface 213 allow the IED 200 to communicate over the network 215. It will be appreciated that, as described below, the protocol stack 212 may include an interface layer which comprises the data communications interface 213. The power management application 211 includes software and/or hardware components which, alone, or in combination with other components, implement the power management application 111. The components 201 202 203 may include components which analyze and log the metered/measured data, power quality data or control operation of the IED 200, such as controlling a relay circuit. The components 210 202 203 further include software and/or hardware which processes and communicates data from the IED 200 to other remote devices over the network 215, such as back end servers 121–124 or other IED's 200 (102–109), as will be described below. For example, the IED 200 is connected to a load 218. The power management circuitry 220 includes data logging software applications, memory and a CPU, which are configured to store kWh data from the load 218 in a memory contained within the power management circuitry. The stored data is then read and processed by the components 201 202 203 in the power management application 211. The components communicate with operating system components which contain the protocol stack 212 and the processed data is passed over the network 215 to the appropriate party via the data communications interface 213. One or more of the components 201 202 203 may communicate with one or more application components located on one or other IED's 200 and/or one or more back end servers 121–124.

Figure 2B:
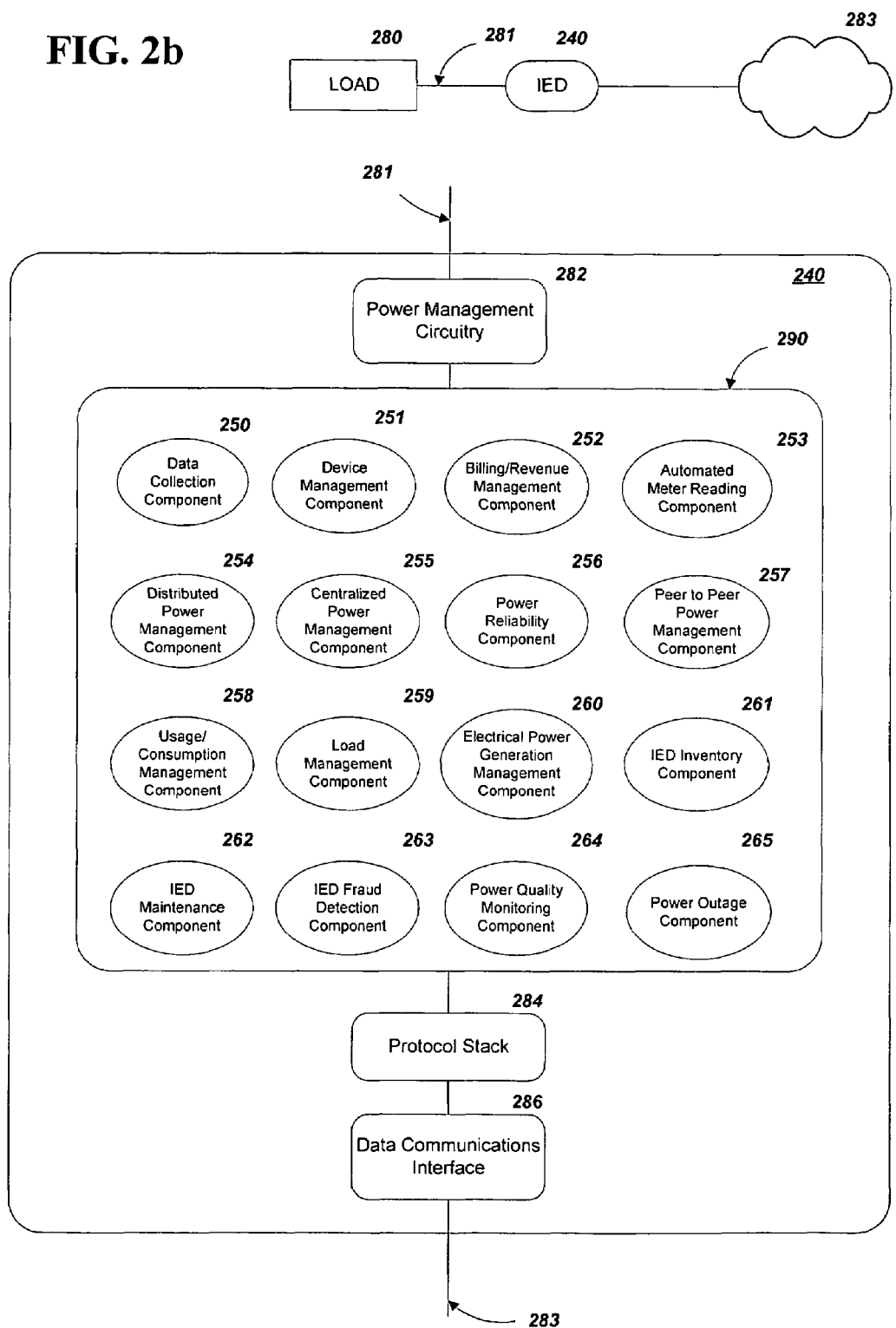
FIG. 2b illustrates another IED, for use with the embodiment of FIG. 1, containing several power management components.

FIG. 2b illustrates an alternate preferred embodiment where an IED 240 is provided which includes power management application components 290. A load 280 is connected to an IED 240 via the electrical power distribution system 281. The IED 240 is further connected to the network 283. The IED 240 contains power management circuitry 282 which is operable to implement the IED's functionality, such as receiving power and generating data from the load 280. The IED further includes a protocol stack layer 284 and a data communication interface 286 which allows the back end server to communicate over the network 283. The power management application components 290 include one or more components such as data collection component 250, an automated meter reading component 253 and a billing/revenue management component 252, which may be revenue certified, a peer-to-peer power management component 257, a usage and consumption management component 258, a distributed power management component 254, a centralized power management component 255, a load management component 259, an electrical power generation management component 260, an IED inventory component 261, an IED maintenance component 262, an IED fraud detection component 263, a power quality monitoring component 264, a power outage component 265, a device management component 251, a power reliability component 256, or combinations thereof. Furthermore, components contained on one IED 240 may operate simultaneously with components on an IED 102–109, 200 or another IED 240 or back end server (not shown). More component details and examples are given below.

In one embodiment the application components comprise software components, such as an email server or an XML or HTTP server. These servers may include a Microsoft Exchange server or a BizTalk framework/XML compatible server. A Microsoft Exchange™ server is an email server computer program manufactured by Microsoft Corporation, located in Redmond, Washington, typically operating on a server computer which facilitates the reception and transmission of emails, and forwards emails to the email client programs, such as Microsoft Outlook™, of users that have accounts on the server. BizTalk is a computer industry initiative which promotes XML as the common data exchange for e-commerce and application integration over the internet. BizTalk provides frameworks and guidelines for how to publish standard data structures in XML and how to use XML messages to integrate software components or programs. Alternately, hardware components, such as a dedicated cellular phone, GPS encryption or decryption key or dongle are included in the components. In a further embodiment, a combination of both hardware and software components are utilized. Additionally, referring back to FIG. 1, one or more power management application components 290 can utilize the architecture 100 to implement their finctionality. For example, a utility 130 has a back end server 124 which contains power management application and associated components, such as a usage and consumption management component 258. The utility 130 supplies power to a consumer 132 via the network 110 and monitors the consumers power consumption using the power management application components on the back end server 124 which communicates with the IED's 104, 105, 108 via the network 110 to retrieve measured consumption/usage data. The consumer 132 concurrently monitors usage of loads 150 151 153, where generator 152 supplies power usage load 153, using an IED 104, 105, 108 which is connected to the network 110, computing real time costs posted by the utility 130. A second customer 133 can also concurrently monitor usage loads 155 156 157 where generator 154 supplies power to usage load 157. In one embodiment, the consumer 132 monitors usage using back end server 120 which receives usage and consumption data from the IED's 104, 105, 108 via the network 110. The IED 104, 105, 108 implements power management application components such as load management components and billing management components. The back end server 120, 124 implements power management application components such as a data collection component, a billing/revenue management component, an automated meter reading component or a usage/consumption management component. The components on the IED 104, 105, 108 work in concert with the components on the back end server 120, 124 via the network 110 to implement the overall power management application. In a further embodiment, one or more power management application components are operating on IED 104, 105, 108 and/or back end servers 120, 124 at any given time. Each power management application can be utilized by one or more users, or different applications can be used by different users. Moreover, the application components can exist on the same or different IED's 104, 105, 108 or back end servers 120, 124.

In the preferred embodiment, the data collection component 250 enables an IED to collect and collate data from either a single or multiple sources via the network 110. The data collected by the component is stored and can be retrieved by other components of the power management application components 290, or other components implemented on other IED's 102–109 located on the network 110. In the preferred embodiment the Automated Meter Reading component 253 is utilized to allow either the consumers 132, 133 or providers 130, 131 to generate power management reports from the IED data. In the preferred embodiment the electrical power generation management component 260 analyzes data received from IED's 102–109 to either minimize or maximize measured or computed values such as revenue, cost, consumption or usage by use of handling and manipulating power systems and load routing. IED inventory, maintenance and fraud detection component 261, 262, 263 receive or request communications from the IED's 102–109 allowing the power management application to inventory the installed base of IED's 102–109, including establishing or confirming their geographic installation location, or check the maintenance history of all connected IED's 102–109 These power management applications aid in confirming outage locations or authenticating communications to or from an IED 102–109 to prevent fraud and minimize errors. In one embodiment, the IED inventory component 261 utilizes cellular triangulation technologies, or caller ID based geographic locator technologies to determine and verify IED inventories. In the preferred embodiment the fraud detection component 263 further detects device tampering. In the preferred embodiment the power quality monitoring component 264 monitors and processes electric parameters, such as current, voltage and energy which include volts, amps, Watts, phase relationships between waveforms, kWh, kvAr, power factor, and frequency, etc. The power quality monitoring component 264 reports alarms, alerts, warnings and general power quality status, based on the monitored parameters, directly to the appropriate user, such as customers 132, 133 or utilities 130, 131.

Figure 3A:
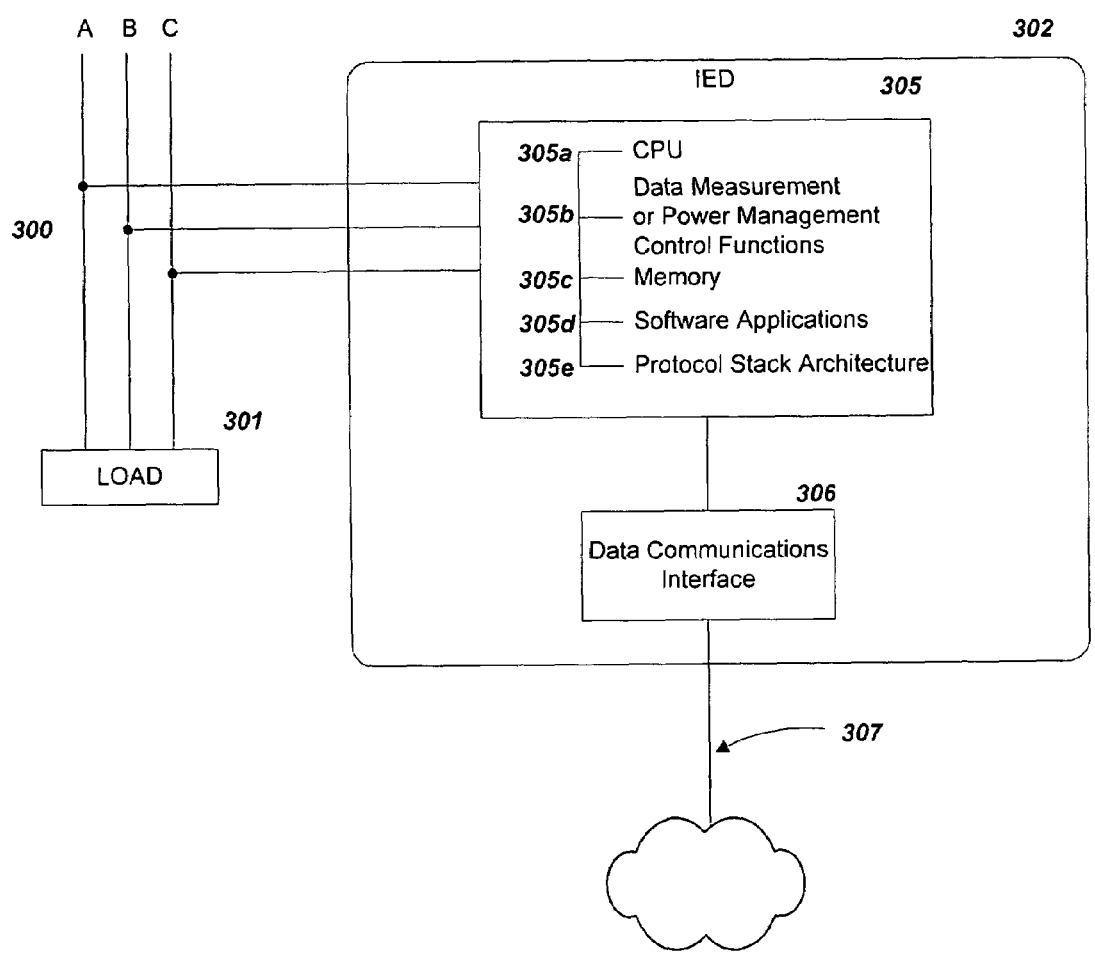
FIG. 3a illustrates an IED, for use with the embodiment of FIG. 1, connected to a power system.

FIG. 3a illustrates a preferred embodiment of an IED 302 for use with the disclosed power management architecture 100. The IED 302 is preferably coupled with a load 301 via a power a distribution system 300, or portion thereof. The IED 302 includes device circuitry 305 and a data communications interface 306. The IED 302 is further coupled with a network 307. The device circuitry 305 includes the internal hardware and software of the device, such as the CPU 305*a*, memory 305*c*, firmware and software applications 305*d*, data measurement functions 305*b* and communications protocol stack 305*e*. The data communication interface 306 couples the device circuitry 305 of the IED 302 with the communications network 307. Alternate embodiments may have power management control functions 305*b* in place of data measurement circuitry. For example, a relay may include a control device and corresponding control functions that regulate electricity flow to a load based on preset parameters. Alternately a revenue meter may include data measurement circuitry that logs and processes data from a connected load. IED's may contain one or the other or combinations of circuitry. In an alternate embodiment the circuitry includes phasor monitoring circuits (not shown) which comprise phasor transducers that receive analog signals representative of parameters of electricity in a circuit over the power distribution system. Further detail and discussion regarding the phasor circuitry is discussed in U.S. patent application Ser. No. 08/798,723, captioned above.

Figure 3B:
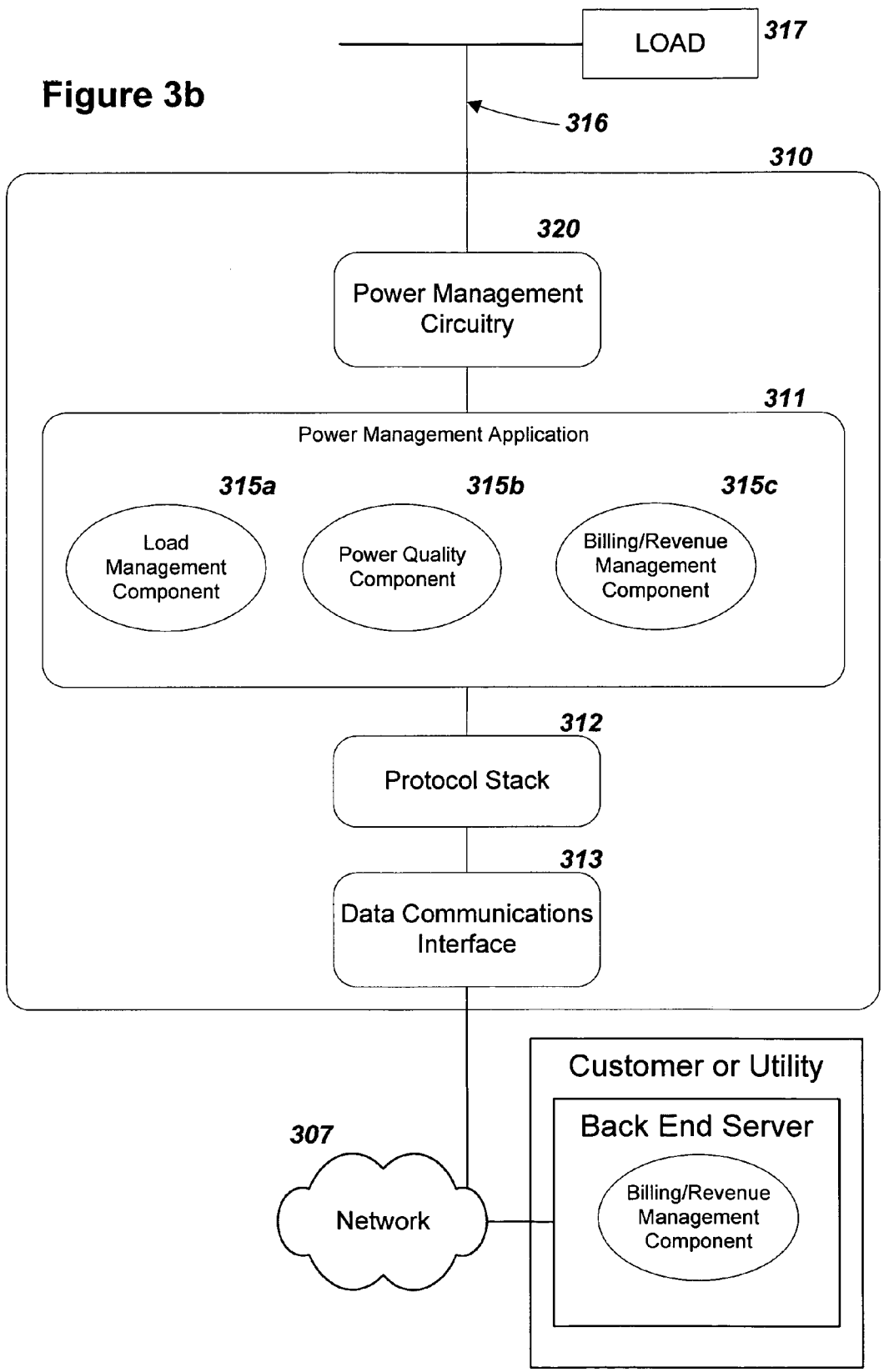
FIG. 3b illustrates the internal components of an IED for use with the embodiment of FIG. 1.

FIG. 3*b* illustrates a more detailed embodiment of the IED's 310 power management application components 311 and protocol stacks. The IED 310 includes power management application components 311, a communications protocol stack 312 and a data communications interface 313 (as was noted above, in alternate embodiments, the protocol stack 312 may include the data communications interface 313). The application components 311 includes a Load management component 315*a*, which measures the load's 317 consumption of electrical power from the portion of the power distribution system 316, a Power Quality component 315*b*, which measures power quality characteristics of the power on the portion of the power distribution system 316, and a billing/revenue management component 315*c*, which computes the quantity and associated value of the incoming power. The power management components are connected to the network via the data communications interface 313 using the communications protocol stack 312 (described in more detail below).

In one embodiment, a Billing/Revenue Management component on a back end server receives the billing ahd revenue computations over the network 307 from the billing/revenue management component 315*c* on the IED 310. These computations are translated into billing and revenue tracking data of the load 317 associated with the IED 310. The Billing/Revenue Management component on the back end server then reports the computations to the appropriate party operating that particular back end server or subscribing to a service provided by the operator the back end server, either the consumer or provider of the electrical power. Additionally, the Billing/Revenue Management component 315*c* on the IED 310 or the Billing/Revenue Management component on the back end server computes usage and cost computations and tracking data of the associated load and reports the data to the appropriate party. In a still another embodiment, IED 310 transmits billing and revenue data directly to the Billing/Revenue Management component over the network 307 and the Billing/Revenue Management component computes usage and cost computations and tracking data of the associated load and reports the data directly to the appropriate party. Furthermore, tariff data received from the utility by the Billing/Revenue Management component 315*c* is factored into usage or cost computations.

Figure 3C:
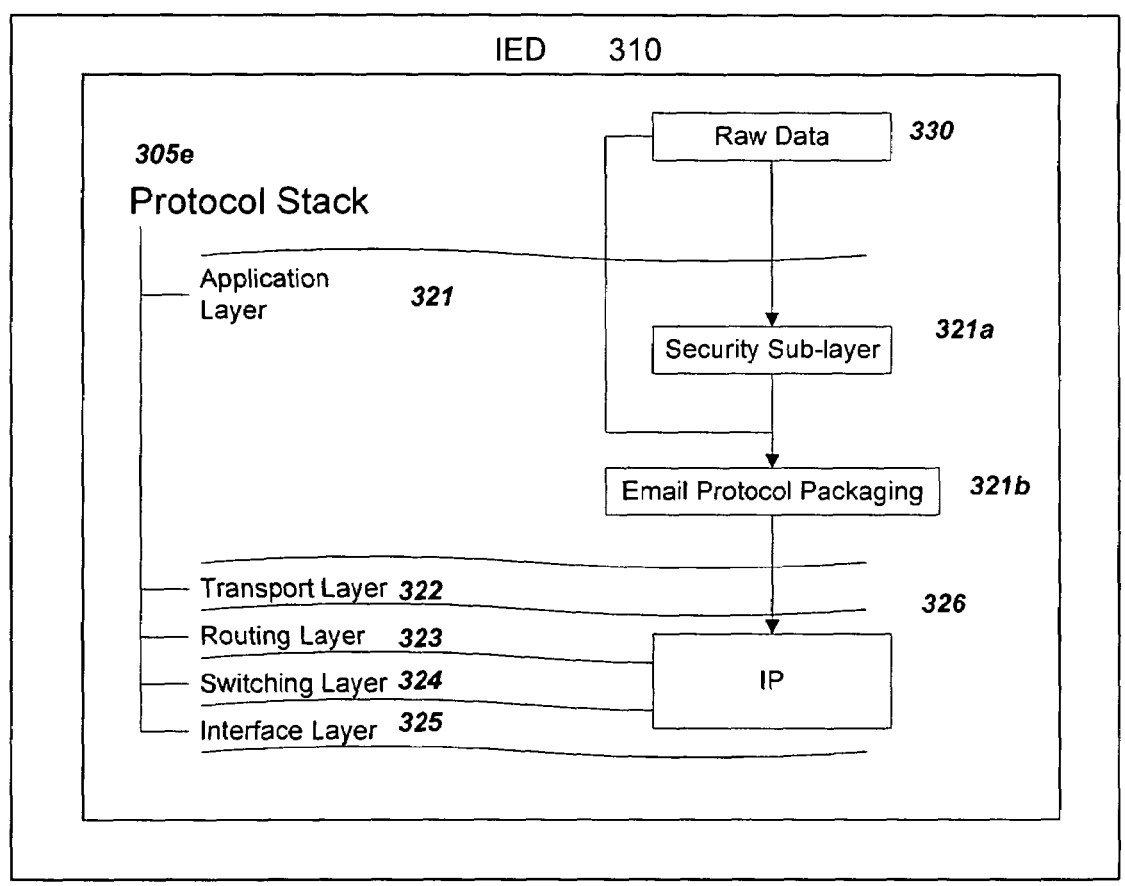
FIG. 3c illustrates a preferred protocol stack of an IED for use with the embodiment of FIG. 1.

FIG. 3*c* illustrates a preferred embodiment of the communications protocol stack 305*e*. In the preferred embodiment the connection between devices coupled with the network 110 is established via the Transmission Control Protocol/Internet Protocol ("TCP/IP") protocol suite. To facilitate communications over a network or other communications medium, devices typically include a set of software components known as a protocol stack. The protocol stack handles all of the details related to communicating over a given network so that other application programs executing on the device need not be aware of these details. The protocol stack effectively interfaces one or more application programs executing on the device to the network to which the device is connected. Typically, the protocol stack is arranged as a layered architecture with one or more software components in each layer. In the preferred embodiment, the protocol stack includes an application layer 321, a transport layer 322, a routing layer 323, a switching layer 324 and an interface layer 325. The application layer 321 includes all of the applications component software and/or power management component software. The application layer 321 is coupled with the transport layer 322. Applications or software components in the application layer communicate with the transport layer in order to communicate over the network. In the preferred embodiment, the transport layer is implemented as the Transmission Control Protocol ("TCP"). The transport layer, using TCP, divides communications from the applications of the application layer 321 into one or more packets for transmission across the network. The transport layer adds information about the packet sequence to each packet plus source and destination information about what application component generated the communication and to what application component on the receiving end the communication should be delivered to once reassembled from the constituent packets. The routing layer is coupled with the transport layer and is responsible for routing each packet over the network to its intended destination. In the preferred embodiment, the routing layer is implemented as the Internet Protocol ("IP") and utilizes internet protocol addresses to properly route each packet of a given communication. The switching and interface layers 324, 325 complete the protocol stack and facilitate use of the physical hardware which couples the device to the network. This hardware may include an Ethernet interface, a modem, or other form of physical network connecting including RF based connections such as Bluetooth interfaces. Generally, the preferred embodiments are capable of communicating via any network which transmits information utilizing the TCP and IP, collectively TCP/IP, protocols as are known in the art. TCP/IP is essentially the basic communication language of the both the Internet and private intranets. TCP/IP utilizes the communications protocol stack and can be described as comprising a TCP layer which manages the decomposing and reassembling of messages from the application layer 321 into smaller more manageable packets, and the IP layer which handles the addressing of the packets. The IP layer comprises the routing layer 323, the switching layer 324 and the interface layer 325. The interface layer 325, as described above, makes the physical connection with the network utilizing connections such as Ethernet, dial-up-modems, Point-to-Point Protocol (PPP), Serial Line Interface Protocol (SLIP), cellular modems, T1, Integrated Service Digital Network (IDSN), Digital Subscriber Line (DSL), Bluetooth, RF, fiber-optics or AC power line communications. In an alternate embodiment multiple interface layers 325 are present. For example, the interface layer 325 contains both an Ethernet and cellular modem thus enabling the IED to connect to the network with either interface. This redundancy is advantageous if one interface is inoperable due to a local Ethernet or cellular network outage. It is preferable that one or more of the application components in the application layer 321 implement TCP compatible protocols for the exchange of their communications over the network. Such TCP compatible protocols include the Instant Messaging protocol, file transfer protocol ("FTP"), or Hypertext Transport Protocol ("HTTP"). In addition, a Secure HTTP (S-HTTP) or Secure Socket Layers (SSL) may also be utilized between the application layer 321 and the transport layer 322 for secure transport of data when HTTP is utilized. S-HTTP is an extension to HTTP that allows the exchange of files with encryption and or digital certificates. SSL only allows authentication from the server where S-HTTP allows the client to send a certificate to authenticate to the user. The routing layer 323 and the switching layer 324 enable the data packet to arrive at the address intended.

In operation the IED monitors the power distribution system for events such as wave shape deviation, sag, swell, kWh, kvA or other power usage, consumption, or power quality events and disturbances. In one embodiment, when the IED detects an event, it processes the event and generates an email message using an email client application component for transport over the network to a back end data collection server. Raw data 330, such as the error message generated from the IED or a billing signal, is passed into the application layer's 321 Security Sub-layer 321a where it is encrypted before email protocol packaging 321b takes place. Once the data 330 has been encrypted and packaged, the message is passed through the remaining IP layers 326 where the message is configured for transmission and sent to the destination address. In one embodiment, the destination address is for a back end server implementing a data collection application component. This back end server may be operated by the consumer or supplier of electrical power or a third party as described above. In an alternate embodiment the Security Sub-layer 321a includes authentication or encryption, or alternately the Security Sub-layer 321a is bypassed. The application layer may include application components which implement protocols that are designed to pass through a firewall or other type of software that protects a private network coupled with a publicly accessible network. Multiple redundant data messages may be sent from the IP layer to ensure the complete data packet is received at the destination. In the above operation, the protocol stack, which includes an SMTP or MIME enabled email client, is a scalable, commercial product such as the Eudora™ email client manufactured by Qualcomm, Inc., located in San Diego, Calif. In an alternate embodiment data messages may also be sent to redundant destination email addresses to ensure delivery of the message. Quality of Service (QoS) may also be implemented, depending on the volume of bandwidth required for the data, ensuring reliable and timely delivery of the data. QoS is based on the concept that transmission rates, error rates, and other characteristics of a network can be measured, improved and, to some extent, guaranteed in advance. QoS is a concern for continuous transmission of high-bandwidth information. The power quality events, consumption, disturbances or other usage data may be stored in the IED and sent to the destination address upon request from an application component operating at the destination address, upon pre-determined time intervals and schedules, upon pre-defined events or in real time. In an alternate embodiment a IED may transport data or requests to or receive data or requests from other IED's directly, also know as peer-to-peer communications. Peer-to-peer is a communications model in which each party or device has the same capabilities and either party or device can initiate communication sessions.

In an alternate embodiment the Security Sub-layer 321a may include multiple encryption keys, each conferring different access rights to the device. This enables multiple users, such as a utility and customers, or multiple internal departments of a utility or customer, to send or receive data and commands to or from the IED. For example a customer's IED sends out two encrypted messages, one billing data and one power quality data, to the customer's office site. The billing data message is encrypted at a level where only the internal accounting department has access to decrypt it. The power quality data message is encrypted at a different level where the entire company can decrypt the message. Furthermore, in the preferred embodiment, commands sent to or from the IED are coupled with the appropriate encryption key. For example, the IED's Security Sub-layer 321a may only permit billing reset commands to be received and processed if the command has been authenticated where the point of origin was the appropriate customer or utility. Further, encrypted email messages may also include various encrypted portions, each accessible and readable with a different encryption key. For example an IED sends out one message to both the utility and the customer containing billing data and power quality data. The data is encrypted with two different encryption keys so only the utility can decrypt the power quality data and only the customer can decrypt the billing data.

In operation the IED monitors the power distribution system 300 for billing events such as, kWh or kvA pulses. In one embodiment the IED may store billing events and transport the data to the power management application components operating on a back end server either upon request or upon pre-determined time intervals. Alternately the IED may transport billing event data in real time to the back end server. Data may be filtered through the either the Back End Server's or IED's power management components or any combination or variation thereof, before being entered into the Billing/Revenue Management component where billing, revenue, cost and usage tracking are computed into revised data. The Billing/Revenue Management components either stores the computations for future retrieval or pushes the revised data to the appropriate party, such as the consumer or provider of the electric power system. Data can be retrieved upon command or sent or requested upon a scheduled time.

In the preferred embodiment the back end server's operate in a similar approach to the IED's. The back end server contains a transport protocol stack and power management application components. Alternatively, a back end server could be a function or component of the IED, i.e., implemented as an application component.

Figure 4A:
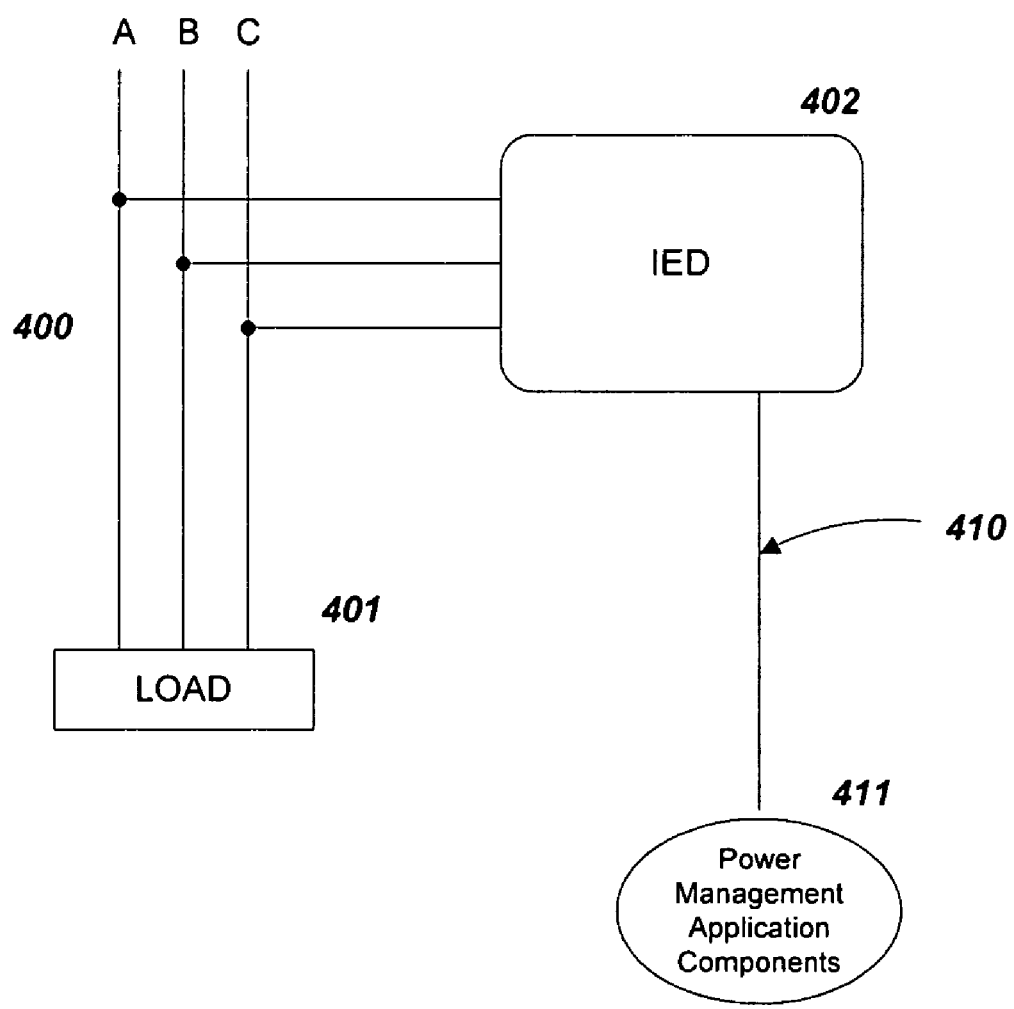
FIG. 4a illustrates an IED, for use with the embodiment of FIG. 1, coupled with power management components.

The IED 402 implements power management functions on the whole electrical power distribution system 400 or just a portion thereof. Referring to FIG. 4a the IED 402 monitors the electrical power via the system 400 to a load 401 and reports events and data to the power management application components 411 through the network 410. The power management application components 411 are preferably operating on a back end server. The events and data are collected and processed through the automated meter reading components, billing/revenue management components or a combination and variation thereof, and revised data or commands are sent back to the IED through the network 410, enabling control of the power flow and distribution of the loading on the power distribution system. The automated meter reading component allows for retrieval and collection of data for the customer, utility or third party. The component further allows for schedule driven, event driven or polling commands which are operable to push data onto the network.

Figure 4B:
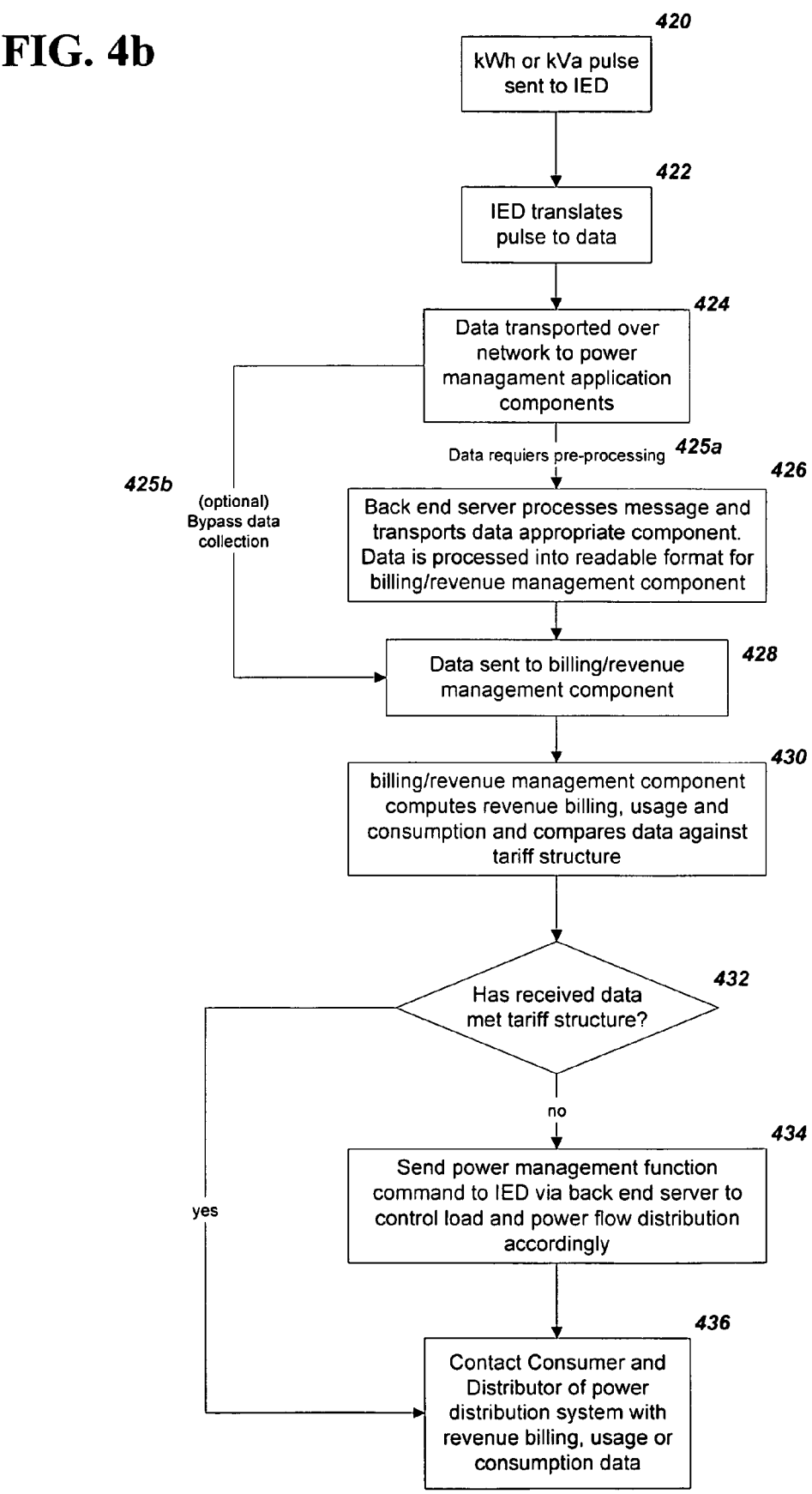
FIG. 4b illustrates the use of a power management application component.

The power management functions implemented by the IED's enables the back end servers or IED's to control power flow and distribution over the electrical power distribution system. Specifically the power management application components process power measurement data and generate power measurement and reporting commands, transmitting them to the back end servers or IED's for execution. Referring now to FIG. 4b, in one preferred operation a load is monitored by a IED where kvA or kWh pulses 420 translated into data 422 are sent in real time over the network 424 to the Application via email or another transport protocol. If pre-processing is required 425a the raw pulse data is transported into a data collection server or component where it is translated into a format readable by the billing/revenue management component 426. Alternately, the billing/revenue management component may be configured to receive and process data without pre-processing 425b. Once sent to the billing/revenue management component 428 the data is compared and analyzed according to 430 for usage, consumption or billing revenue ranges against a pre-determined tariff structure 432 where any anomalies, excess or shortages are reported back to the IED in the form of a command to a power management function which controls the power flow and load distribution accordingly 434. The components further contact the required parties, such as the consumer or provider of the load, over the network, forwarding power quality, billing, usage or consumption reports or any power management functions that were required against the set tariff structure according to 436.

Figure 5A:
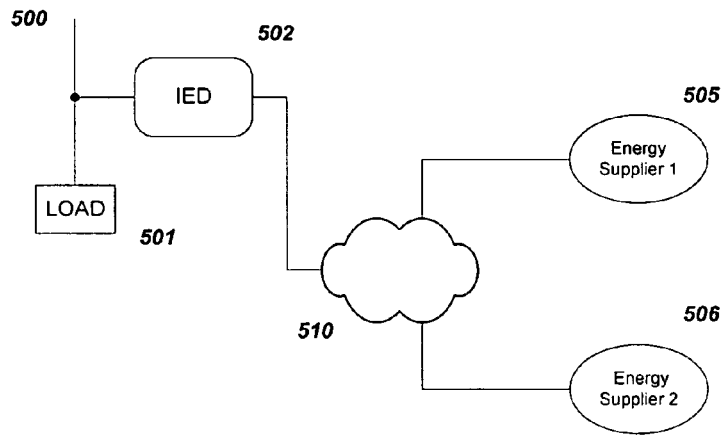
FIG. 5a illustrates a preferred embodiment with multiple energy suppliers.
Figure 5B:
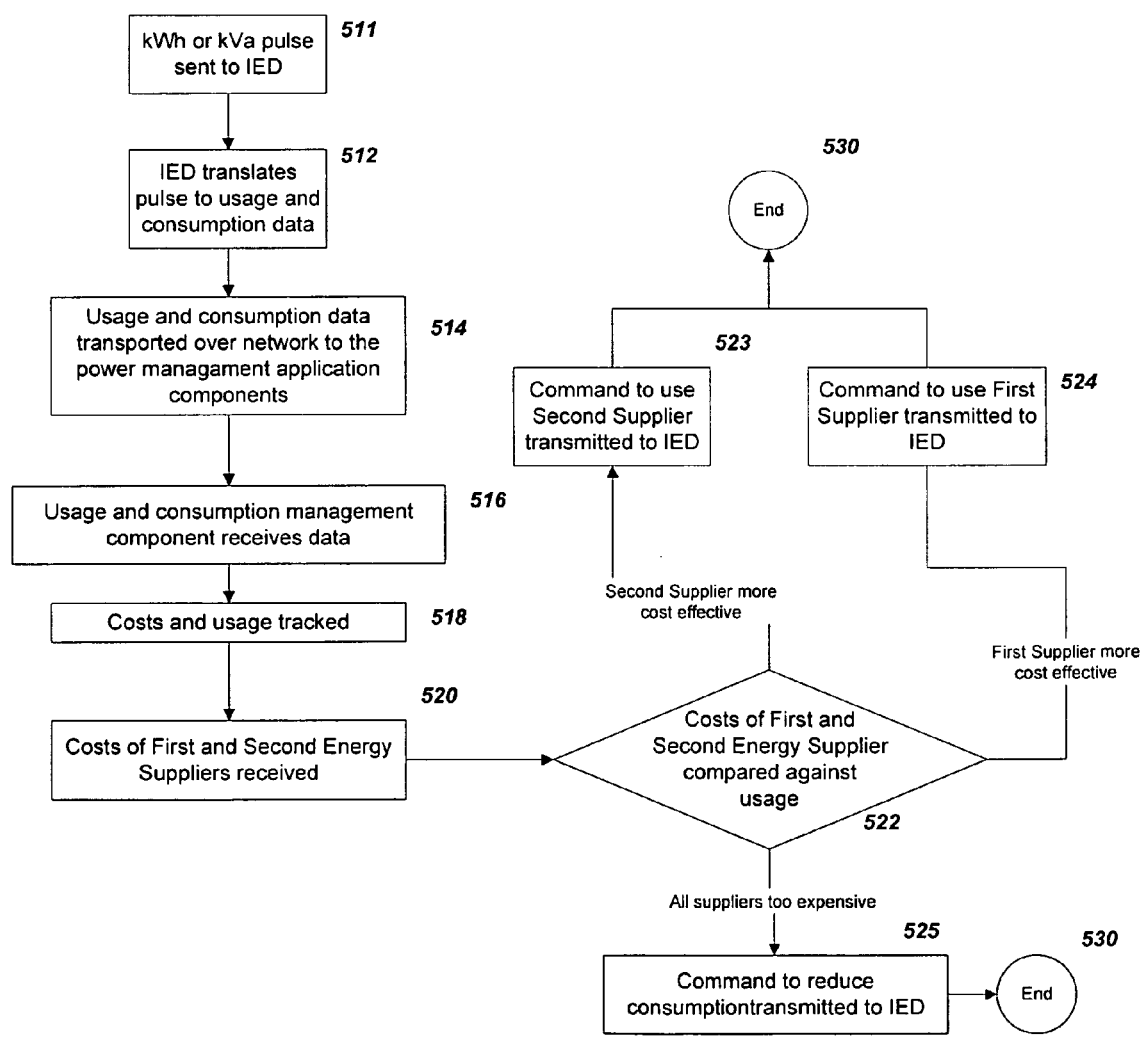
FIG. 5b illustrates a preferred method of managing multiple suppliers for use with the embodiment of FIG. 1.

FIG. 5a illustrates a preferred embodiment for a usage and consumption management application of the power management architecture. The IED 502 implements a power management function of controlling the source of electrical power for the load 501 from either energy supplier 1 505 or energy supplier 2 506. The application is designed to take advantage a deregulated marketplace and operate the load 501 from the most cost efficient energy supplier at the given time period. Which supplier is most efficient may fluctuate frequently as a function of the energy market and supply and demand for electrical power. Referring to FIG. 5b, the IED 502 contains a usage and consumption management component which receives tariff and cost structures from multiple energy suppliers 505, 506. The component receives usage and consumption from the Load 501 and compares actual usage against multiple tariff structures choosing the most cost effective provider for a given load. Similarly the load management component 259, as shown in FIG. 2b, is utilized to connect and disconnect loads to and from the electrical distribution system during either low and high rate and demand periods, hence reducing the electrical power costs and demand. In the preferred embodiment the load management component 259 is programmed to run in an automated fashion based on feedback from the system, however in an alternate embodiment the component is operated manually based on user input.

For example, an IED 502 is connected to a power line 500 and associated load 501. The IED 502 measures power usage by the load and by converting a kWh or kVa pulse 511 into data 512 and transmits this consumption data 514 over a network 510 to a usage and consumption management application component operating on a back end server. The Usage and consumption management component receives and tracks cost and usage 516, 518 and upon receiving costs 520 compares rates for actual usage against multiple supplier bids 522. Suppliers have the option to either push tariff structures to the application component or have tariff structures polled over the network. Once the most cost effective structure is determined by the usage and consumption management component, a command or function is sent to the IED 502 with the new tariff structure 523, 524 and the process is complete 530. Alternately, the new tariff structure is applied across to the billing/revenue management component where billing is applied to the usage and revenue reports are forwarded onto the appropriate parties.

In another example the usage and consumption management component determines all suppliers tariff structures are too expensive to warrant usage or consumption thus a command to reduce consumption to a desired level is transmitted over the network to the IED 525. Furthermore, an alternate embodiment includes application of real-time usage and cost monitoring of loads being measured by an IED and multiple energy and distribution system suppliers.

In an alternate embodiment the usage and consumption component is pre-programmed to monitor and shed loads based on a exceeding a set tariff structure. For example an IED 502 monitors a load 501 connected to a power distribution system 500. Energy is supplied by an energy supplier 505. The IED contains a tariff structure that has a limit of $0.80/kWh during peak hours of 6 am to 6 pm and a limit of $0.60/kWh for non-peak hours of 6 pm to 6 am. The IED 502 monitors the power usage of the load 501 vs. the actual tariff structure of the energy supplier and shuts the load 501 off if the actual tariff exceeds the limits of $0.80/kWh during peak times or $0.60/kWh during non-peak times.

The centralized power management component 255 allows the centralization of work at one location, such as a centralized billing server, load management server or master IED, which collects and processes data from various devices spread over the network. In operation, remote IED's connected to the network transmit data to the centralized power management component where operations such as billing, load management, usage and consumption reporting are processed in one central location.

Figure 6:
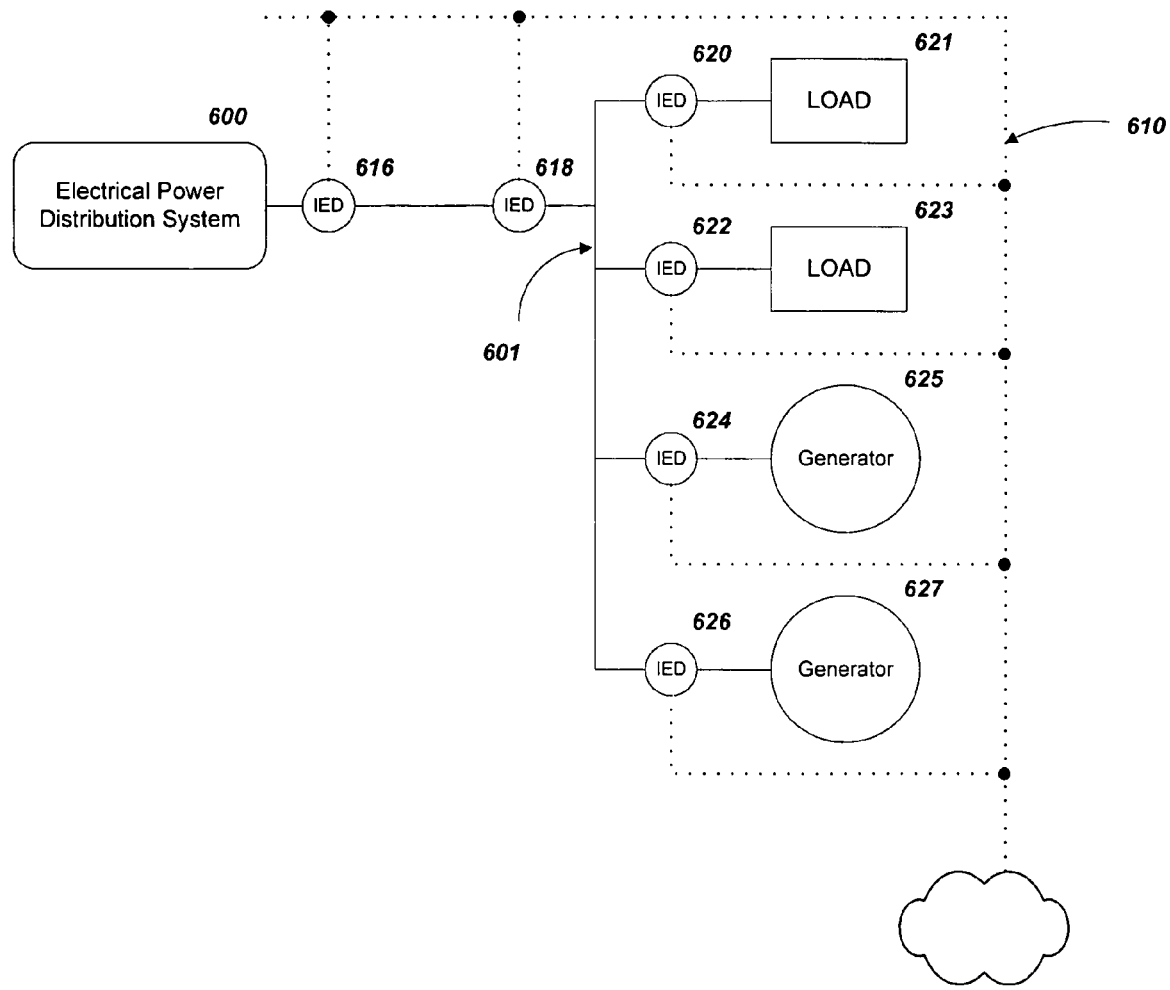
FIG. 6 illustrates a second embodiment using a distributed power management component.

The distributed power management component 254 allows for the distribution of work or data processing to various devices on the network. In operation, an IED measures or detects an occurring or impending catastrophic power quality event and alerts other downstream IED's (on the power distribution network) of the event thereby giving the downstream IED's an opportunity to disconnect or alter loads before the event reaches the downstream system and causes damage. The component further includes a function that, upon detection of an occurring or impending event, alerts downstream IED's or back end servers to alert their connected loads to either protect themselves from the outage by shutting down, or instructing them to shut down applications that may cause critical failure or damage if interrupted, such as writing to a hard-drive. FIG. 6 illustrates a preferred embodiment of the distributed power management component in action. An Electrical power distribution system 600 distributes energy over distribution lines 601 which are connected to multiple IED's 620, 622, 624, 626 which are present to continuously monitor the energy being fed onto their respective loads 621 623 and generators 625 627 on a given branch and furthermore all IED's 620, 622, 624, 626 are connected via a network 610 as described above. IED's 616 618 are also present on the distribution system 600 to continuously monitor energy being transferred onto the system as a whole. It will be appreciated that the loads and generators may reside on multiple or separate consumer sites. In operation, a catastrophic power quality event is detected on a load 623 by the attached IED 622. The IED 622 takes appropriate action, such as triggering a protection relay, on the load and further transmits communications of its actions to upstream IED's 616 618. This ensures local containment of the event by the IED 622 informing upstream IED's to not duplicate the action on the larger system. Obviously retaining upstream IED's as a backup is not discounted in this operation. Alternatively, the operation is utilized to coordinate downstream IED's over the network 610. For example an event may be detected at the distribution system 600 by an IED 616 monitoring the system 600 which triggers, for example, a protection relay. The IED 616 which triggered the protection relay communicates its actions to downstream IED's 618 620 622 624 626 over the network 610 allowing them to take appropriate intelligent action, such as disconnection the generators 625 627. It can be appreciated that IED applications may include a combination of the centralized and distributed power management components.

In one embodiment, a power reliability component 256 is provided in the IED to measure and compute the reliability of the power system. Power system reliability is discussed in commonly assigned U.S. patent application Ser. No. 09/724,309, noe U.S. Pat. No. 6,671,654, issued on Dec. 30, 2003, titled "APPARATUS AND METHOD FOR MEASURING AND REPORTING THE RELIABILITY OF A POWER DISTRIBUTION SYSTEM", captioned above. In the preferred embodiment the component 256 computes and measures reliability as a number of "nines" measure. The component includes a function which compiles the reliability of the power from other components located on back end servers or IED's, giving a total reliability. This function also enables a user to determine which part of the distribution system has the most unreliable power. Knowing this enables the user to focus on the unreliable area, hopefully improving local power reliability and thus increasing overall reliability.

Figure 7:
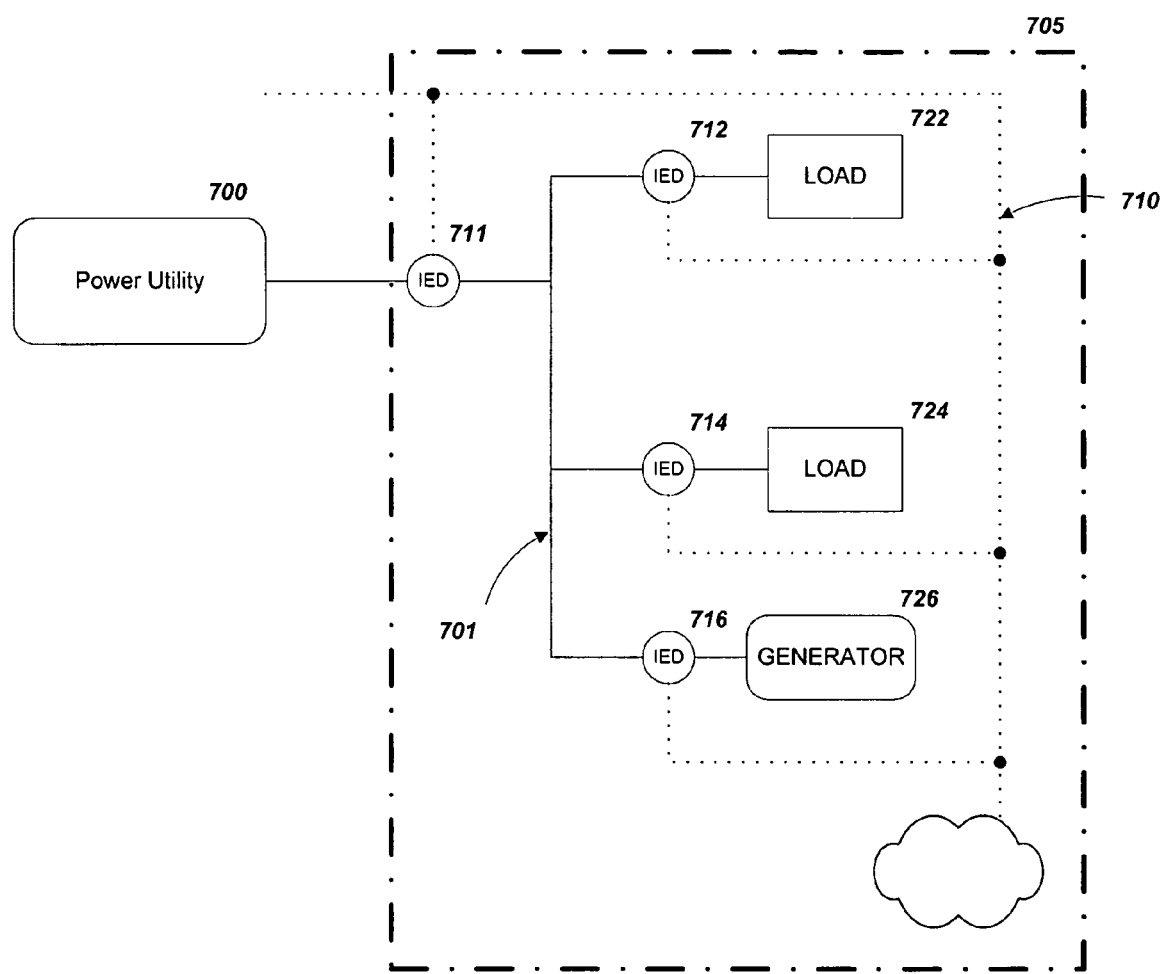
FIG. 7 illustrates a third embodiment using a power reliability component.

For example, referring now to FIG. 7, an IED 711 is connected to a network 710 and measures the reliability of the power distribution system 701 which supplies power from a power utility 700 to loads 722 724 within a customer site 705. The customer also provides a generator 726 which supplies power to the loads 722 724 at various times. The customer measures the power reliability of the system for the load 722 724 using the associated IED 712 714 and considers it unreliable. One IED's 714 power reliability component polls the other IED's 711 712 716 and determines the unreliable power source is coming from the generator 726. From this the customer can decide to shut off the power supply from the generator 726 in order to improve the power reliability of the system.

In another embodiment, a power outage component 265 is provided in the IED which informs the appropriate parties of a power outage using email or other transport protocols. In the preferred embodiment an IED is connected to a power system when a power failure occurs. The IED's power outage component 265 contains hardware, such as a battery backup and modem, which enables the IED to transmit a power failure warning to the appropriate parties, such as the utility or customer, such as by email over a network as described above. Further, a cellular modem may be utilized to call out to indicate the location of an outage. Physical locating algorithms such as cellular triangulation or telephone caller ID can be used to track or verify outage locations.

Figure 8:
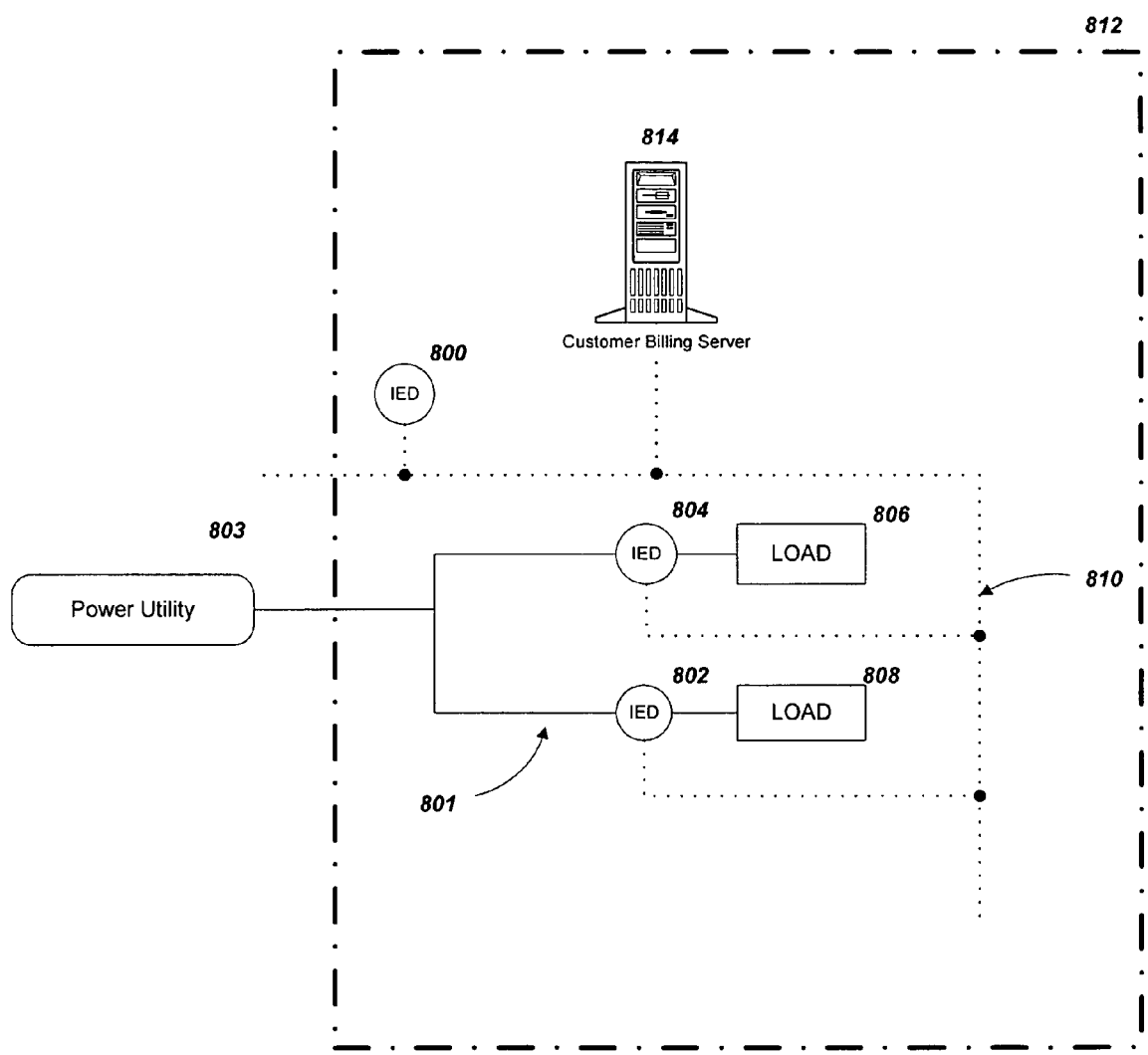
FIG. 8 illustrates a fourth embodiment using a peer to peer component.

Peer to peer communications between IED's and between back end servers are supported by the peer to peer management component 257. In the preferred embodiment peer to peer communications are utilized to transport or compile data from multiple IED's. For example, as shown in FIG. 8, an IED 800 is connected to a network 810. Multiple loads 806 808 draw power from a power utility's 803 power distribution line 801 and each load is monitored by an IED 802 804. An IED 800 polls load and billing data from all other IED's on the network on the customer site 802 804. Upon request, the IED 800 then transmits the load and billing data to the customer's billing server 814. In the preferred embodiment, the IED 800 communicates the load and billing data in a format which allows software programs inside the customer billing server 814 to receive the data directly without translation or reformatting.

Transmission of data in XML format allows a user to receive the data in a readable self-describing format for the application intended. For example, traditional data file formats include comma-separated value files (CSV), which contain values in tables as a series of ASCII text strings organized so each column value is separated by a comma from the next column's value. The problem with sending CSV file formats is the recipient may not be aware of each column's desired meaning. For example, a CSV file may contain the following information sent from a revenue billing application 45.54,1.25,1234 Elm Street, 8500 where 45.54 is the kWh used this month, 1.25 is the kWh used today, 1234 Elm Street is the location of the device and 8500 is the type of device. However, if the recipient of the CSV file was not aware of the data format, the data could be misinterpreted. A file transported in XML is transmitted in HTML tag type format and includes information that allows a user or computer to understand the data contained within the tags. XML allows for an unlimited number of tags to be defined, hence allowing the information to-be self-describing instead of having to conform to existing tags. The same information is transmitted in XML format as:

```
<billing_information>
<kWh_month>45.54</kWh_month>
<kWh_day>1.25</kWh_day>
<location>1234 Elm Street</location>
<device_type>8500</device_type>
</billing_information>
```

Figure 9:
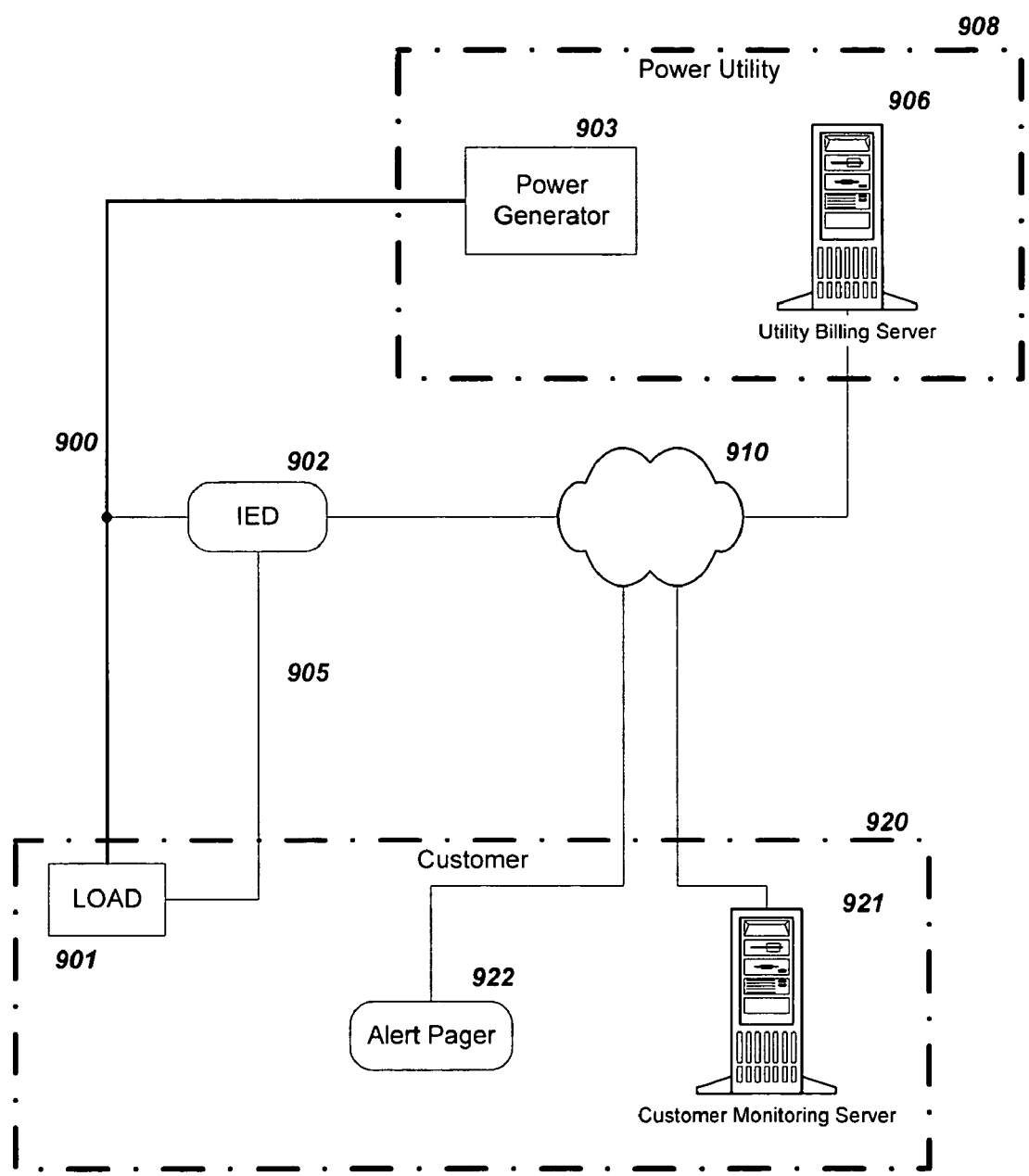
FIG. 9 illustrates an IED, for use with the embodiment of FIG. 1, transmitting data to multiple recipients.

Transmission in XML format allows the recipient to receive XML-tagged data from a sender and not require knowledge of how the sender's system operates or data formats are organized. In a preferred embodiment communications between IED's connected to the network are transmitted in XML format. An IED utilizes XML based client application components included within the power management applications and transmits the data in XML format so little or no post-processing is required. FIG. 9 illustrates an example of the preferred embodiment. An IED 902 is connected to a power distribution line 900 and associated load 901 owned by a customer 920 through connection 905. Power is supplied by a power utility's 908 power generator 903. The power utility also has a utility billing server 906 which compiles billing data from consumers drawing power from their power generators. The IED 902 is connected to the utility billing server via a network connection 910 and the IED 902 measures usage and consumption of the load, and other values associated with billing. The utility billing server 906 contains billing software, such as a MV90, which requires data in a specified format. Either upon request, or a pre-scheduled times, the IED 902 transmits the usage, consumption and billing data associated with the load 901 to the utility billing server 906 in XML format. The customer also has a monitoring server 921 which is dedicated to receiving billing data from the IED 902 and reporting usage and consumption to the appropriate parties, the monitoring server 921 also reads data in a specified format for its associated monitoring software. The IED 902 transmits the same usage, consumption and billing data to the monitoring server 921 in XML format. By utilizing XML data formats the data transmitted by the IED 902 can be read by multiple servers or IED's 902 that do not require knowledge beforehand of the order or type of data that is being sent. In an alternate embodiment an IED 902 may also receive inputs from peripheral devices which may be translated and combined in the XML transmission. For example, the load 901 is a motor which contains a temperature probe. The temperature probe is connected to the IED 902 and allows the IED 902 to monitor the motor temperature in addition to power data on the power distribution line 900. The IED 902 is programmed to act on the temperature input by shutting down the motor if the temperature exceeds a pre-defined critical level by tripping a relay or other protection device (not shown). The IED 902 is further programmed to alert the customer monitoring server 921 and an alert pager 922 and if such an action takes place. This alert transmission is sent in XML format so both the server 921 and the pager 922, which may be configured to read incoming transmissions differently, receive the alert transmission in the form it was intended. It can be appreciated that the IED 902 can receive data in XML format from multiple sources without complete knowledge of their file transfer notations.

Figure 10:
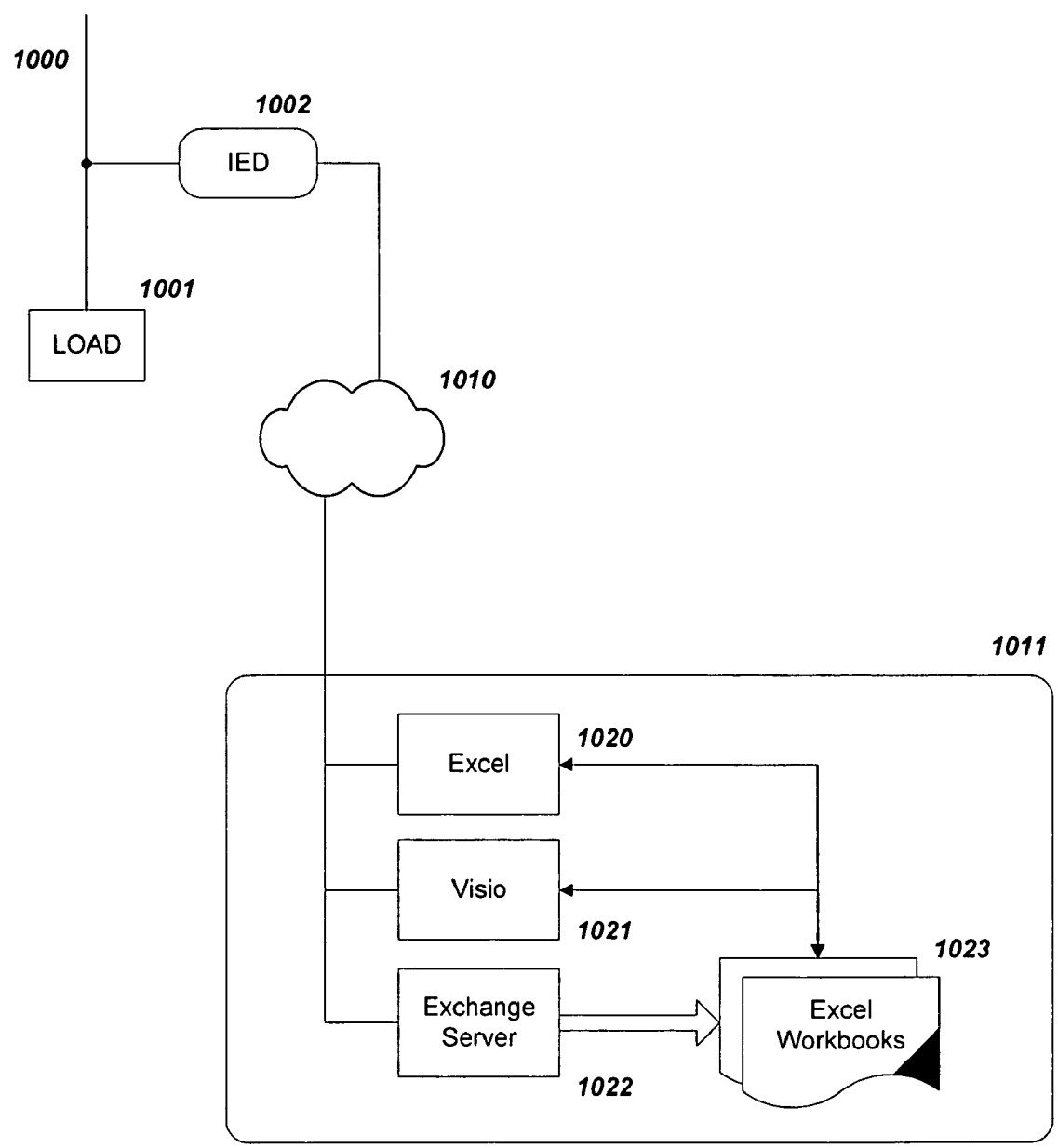
FIG. 10 illustrates a monitoring server, for use with the embodiment of FIG. 1, receiving data from an IED.

In an alternate embodiment the back end servers include software that is generally included on a majority of existing computer systems, such as Microsoft Office™ software, manufactured by Microsoft Corporation, located in Redmond, Wash. which includes the software applications Microsoft Word™ and Microsoft Excel™. The software receives data in a self describing format, such as XML, and the software includes off the shelf applications and processes such as a Microsoft Exchange Server, Microsoft Excel and associated Excel Workbooks, Microsoft Outlook and associated Outlook rules, Microsoft Visio and associated Visio Stencils, Template files, and macros which allow the user to view and manipulate data directly from the IED. In one embodiment the IED transmission format makes use of existing standard software packages and does not require additional low level components, such as a communications server communicating with a serial port, which are normally required to interface to the IED communication ports. Further, the embodiment does not require a separate database, as the data is stored in the software programs. This allows a user to view data from the IED using standard computer software. For example, referring now to FIG. 10, an IED 1002 monitors a load 1001 over power distribution network 1000 and passes the monitored data over network 1010 to a monitoring server 1011. The data can be transmitted using a variety of protocols, such as FTP, TCP/IP or HTTP, as described above. In the preferred embodiment data is transmitted in an HTTP based form or an SMTP form where the HTTP form is a self-describing format such as XML and the SMTP format is an email message. The monitoring server 1011 includes Microsoft Exchange Server 1022, Visio 1021, Microsoft Excel 1020 and Excel Workbooks 1023. The Excel software 1020 is capable of receiving data directly from the IED in a self-describing format, thus allowing the user to view real time load profiles or graphs and other monitored data directly from the IED in real time. The Visio software 1021 is also capable of receiving data directly from the IED in a self-describing format, thus allowing the user to process and view real time data in Visio format. Alternately, the IED transmits power quality, load, billing data or other measured or monitored values to the Excel Workbooks 1023 via the Exchange Server 1022. The Excel or Visio software is then capable of retrieving historical data directly from the workbooks.

Referring to FIG. 11, there is shown an exemplary screen display of a Microsoft Excel worksheet which is coupled with the IED 1002 as described above. In this example, the IED 1002 is a model 8500 meter, manufactured by Power Measurement Limited, in Victoria, British Columbia, Canada. The IED 1002 is coupled via a TCP/IP based network with a personal computer having at least 64 MB memory and 6 GB hard disk with a Pentium™ III or equivalent processor or better, executing the Microsoft Windows 98™ operating system and Microsoft Excel 2000. The computer further includes Microsoft Internet Explorer™ 5.0 which includes an XML parser that receives and parses the XML data from the meter and delivers it to the Excel worksheet. The worksheet displays real time data received directly from the IED 1002 in an XML format. As the IED 1002 detects and measures fluctuations in the delivered electrical power, it transmits updated information, via XML, to the worksheet which, in turn, updates the displayed data in real time. Note that all of the features of the Microsoft Excel program are available to manipulate and analyze the received real time data, including the ability to specify mathematical formulas and complex equations which act on the data. Further, display templates and charting/graphing functions can be implemented to provide meaningful visual analysis of the data as it is received. Further, the real time data can be logged for historical analysis. In one embodiment, the activation of a new IED 1002 on the network is detected by the worksheet which cause automatic generation of a new worksheet to receive and display data from the new device.

As described above, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As described above, alternative embodiments are contemplated herein which relate to Energy Management ("EM") Components that employ various techniques and use various services to enable them to communicate in a secure, safe fashion with one another. These disclosed embodiments relate to EM Networks and EM Systems that employ various means to manage security within the network and the system, as were described above.

Energy Management ("EM") data includes, but is not limited to, Electrical Operation Data such as volts, amps, status, power; Power Quality Data such as harmonics, power factor, reliability (such as number of nines), disturbance data; Consumption Data such as energy and demand; Event Data such as set point actions, status changes and error messages; Financial Data such as energy cost, power factor penalties, revenue data; billing data such as tariffs for gas, water, steam and air; Environmental Data such as temperature, pressure, humidity, pollution, and lightning/atmospheric disturbance data; Water Air Gas Electric Steam ("WAGES") data; Configuration data such as frameworks, firmware, software, calculations involving EM Data and commands; and aggregated data, where at least one energy management datum is combined with other data points. For the purposes of this application, combined data includes measured data, aggregated data and/or computed data.

An EM component is an entity that creates, consumes or routes EM data. These components include but are not limited to: Intelligent Electronic Devices ("IEDs") (also known as EM Devices), analog sensors, digital sensors as described in U.S. Pat. No. 6,236,949, gateways, and computers.

As was described above, IEDs include revenue electric watt-hour meters, protection relays, programmable logic controllers, remote terminal units ("RTUs"), fault recorders, other devices used to monitor and/or control electrical power distribution and consumption, RTUs that measure water data, RTUs that measure air data, RTUs that measure gas data, and RTUs that measure steam data. IEDs are widely available that make use of memory and microprocessors to provide increased versatility and additional functionality. Such functionality includes the ability to communicate with other hosts and remote computing systems through some form of communication channel. IEDs also include legacy mechanical or electromechanical devices that have been retrofitted with appropriate hardware and/or software allowing integration with the power management system. Typically an IED is associated with a particular load or set of loads that are drawing electrical power from the power distribution system. The IED may also be capable of receiving data from or controlling its associated load. Depending on the type of IED and the type of load it may be associated with, the IED implements a function that is able to respond to a command and/or generate data. Functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof. For functions that produce data or other results, the IED can push the data onto the network to another IED or back end server/database, automatically or event driven, or the IED can send data in response to an unsolicited request. IEDs capable of running Internet protocols may be known as "web meters". For example, a web meter may contain a web server.

For the purposes of the disclosed embodiments, a computer is defined as a device that comprises a processing unit and includes, but is not limited to, personal computers, terminals, network appliances, Personal Digital Assistants ("PDAs"), wired and wireless devices, tablet personal computers, mainframes, as well as combinations thereof.

A framework is a set of interconnected functions that are uploadable to a device and that affect the behavior of the device. A framework can be produced from scripting languages like PERL, VBScript and XSLT, predicate logic like Prolog, fuzzy logic and functional programming, spreadsheets like Visicalc and Excel, user interface definitions such as XSLT and XFORMS, and downloadable software that is interpreted, just-in-time compiled or compiled. Alternately, frameworks may be created and manipulated by connecting multiple integrated object network ("ION®") modules together. ION® defines the way information, specifically power monitoring information, is accessed, transferred and manipulated inside an EM Device. The functionality and data manipulation of the EM Device can be accomplished by one or several frameworks stored in the IED software. A complete list of ION® modules is contained in the "ION® Reference Manual", printed by Power Measurement Ltd., located in Saanichton, B.C., Canada.

One or more EM components are coupled together in any configuration to form EM networks. As discussed above, herein, the phrase "coupled with" is defined to mean directly connected to or indirectly connected through one or more intermediate components. Such intermediate components may include both hardware and software based components.

EM systems are formed from coupling one or more EM Networks. When there is more than one EM network within the system, the networks can be linked in any functional way. Not all networks within a system are directly coupled with one another, and EM networks may be coupled with one another via a third EM network. Non-EM networks may also couple EM networks with one another.

These EM networks or EM systems may represent many entities, including Device Manufacturers, Utilities, Power Consumers, End Users, National Accounts Customers, Load Serving Entities ("LSEs"), Application Service Providers ("ASPs"), Independent Service Operators ("ISOs"), Non Affiliated Entities ("NAEs"), customer sites running device configuration utilities, Meter Shops, and Third Party Data Sources providing energy related data such as weather, tariffs and so forth.

LSEs are entities authorized to supply energy to retail customers.

ASPs are typically entities that supply software application and/or software related services over the Internet.

ISOs are entities that were formed to dole out electricity to the grid after deregulation NAEs are groups of entities that may share some information with each other but are not closely tied. For example, utilities, energy marketers, ISOs and other entities all need to exchange EM data with one another as part of their business, but don't necessarily trust each other or share the same private network.

An exemplary device configuration utility is ION® Designer, manufactured by Power Measurement Ltd, of Saanichton, B.C. Canada.

Meter Shops are plants or industrial units where IEDs are configured.

Some EM components may host Energy Management Software ("EM Software") systems that allow users to manage associated EM components, networks and/or systems. An exemplary EM Software package is ION® Enterprise, manufactured by Power Measurement Ltd, of Saanichton, B.C. Canada. For the purposes of this application, a user is considered to be either a person or a component that interacts with, extracts data and provides commands and data to an EM component, EM network, or EM system.

EM components within the same network communicate with one another via channels. Components in different networks communicate with one another as well, possibly using different channels. A channel is essentially the infrastructure used to move data from one place to another, and can include public or third-party operated networks such as: Virtual Private Networks ("VPNs"), Local Area Networks ("LANs"), Wide Area Networks ("WANs"), telephone, dedicated phone lines (such as ISDN or DSL), Internet, Ethernet, paging networks, leased line; Wireless including radio, light-based or sound-based; Power Line Carrier schemes; spatial movement of data using Newtonian means including data stored in some format such as printed, magnetic, optical, flash memory, RAM, on a computer, Personal Digital Assistant ("PDA"), Hand-Held Format ("HHF") reader or other device, and transported by couriers, postal services or Meter Readers driving around in trucks.

VPNs connect disjoint parts of the same network. They also allow authenticated users to communicate securely over the Internet with a protected or private network. VPNs work by allowing client devices to securely communicate with a VPN concentrator or server. The client or concentrator may be embedded in another device such as a firewall or a router. This is particularly valuable when users are separated by geographic distance that otherwise limits their access to the protected or private network.

Power Line Carrier describes a family of networking technologies that enable computer and voice networking over existing electrical wiring.

Various protocols used in the system include but are not limited to: TCP/IP, Bluetooth, Ethernet, IEEE 802.11a, IEEE 802.11b and IEEE 802.11 g, HTTP, SMTP, NNTP, POP, IMAP, IPSec, Trivial File Transfer Protocol ("TFTP"), Blocks Extensible Exchange Protocol ("BEEP"), Zigbee, MIME, SNMP, SOAP, and XML-RPC.

Many different data formats that may be used to exchange data, including but not limited to: binary, XML, XHTML and XHTML Basic, XHTML Basic as an Infoset in another form besides tagged text, Binary encoded equivalents of XML Infosets including Wireless Binary XML ("WBXML"), ASN.1 encoded XML, SVG, Direct Internet Message Encapsulation ("DIME"), CSV, XML RPC, SOAP (with signature at SOAP level and/or enclosed content level), SOAP (using WS-SECURITY with signature at SOAP level and/or enclosed content level), application specific content like spreadsheet data, an HTTP response to an unsolicited HTTP request, a response to an unsolicited message, HHF, PQDIF, MODBUS, ION®, or other SCADA protocol where a response can be packaged up and embedded in another protocol or format. These formats are frequently sent as MIME or UUENCODE attachments and are considered part of the protocol stack.

Most channels between components in an EM System are insecure channels subject to security attacks including malicious acts such as forgery, denial of service, invasion of privacy and so forth. Messages passed over insecure channels are subject to interception, tampering and fraud. Successful malicious acts may result in unintentional security breaches such as faults, power outages, financial losses, exposure of sensitive data, turning off or on equipment that other parts of system rely on, depriving use of the system, and so forth. Legitimate users may also unintentionally perform some action that compromises the security of the system.

As EM systems expand and incorporate public networks, particularly the Internet, wireless networks and telephone systems, the need for secure transfer of data becomes crucial. It is hereby the purpose of the disclosed embodiments to provide robust security to an EM Network or to an EM Device on a network.

There are many EM Systems and activities that require security due to economic impact caused by an antagonist preventing a valid action from taking place or initiating an undesired change in the electrical system. One application is EM Systems where EM Components are able to curtail loads or startup generators in response to an authorized command. Such a command may come from an energy analytics system or standard SCADA system that issues the command based on an economic analysis or an LSE with which the energy consumer has a curtailment agreement. EM Devices provide data indicating how much load has been curtailed, the current load, the current rate of greenhouse gas emissions, etc, to other applications in the system. These applications may be real-time energy analytics applications that make decisions based on the economics of curtailing loads or firing up generators or applications run by an LSE. In some systems, a message may be broadcast to thousands of loads via USENET, wireless, email, HTTP Rendezvous, Smart Personal Object Technology ("SPOT") etc.

HTTP Rendezvous is described in pending U.S. patent application Ser. No. 10/340,374 "PUSH BASED COMMUNICATIONS ARCHITECTURE FOR INTELLIGENT ELECTRONIC DEVICES", now abandoned, which is hereby incorporated by reference.

SPOT is a technology that uses the FM band and is coupled with a new digital radio infrastructure. Utility rates tables, firmware upgrades, time syncs and other unidirectional communications can be transmitted inexpensively to EM Components using SPOT.

Other applications include securely exchanging data across an enterprise or across insecure channels and perimeters to service companies who provide energy analytics services, billing and department sub-billing services, bill verification services, PQ Event analysis and classification, academic research into energy economics, or exchange of data with building management systems (i.e. to control thermostat limitations based on economic information determined by EM systems, or ERP systems for production planning, etc.)

Another application is where some information is sent to the consumer of energy for them to manage their usage, and some information is sent to the supplier to do billing.

Security Mechanisms

There are various techniques, including encryption, authentication, integrity and non-repudiation that provide secure communications. Encryption provides privacy by preventing anyone but the intended recipient(s) of a message from reading it. Authentication ensures that a message comes from the person from whom it purports to have come from. Integrity ensures that a message was not altered in transit. Non-repudiation prevents the sender from denying that they sent a message.

Various mechanisms can be used to secure parts of the system and the transmission process. Their particular applications to EM systems will be described in detail later.

With Public Key Encryption, each user has a pair of keys, a public encryption key, and a private decryption key. A second user can send the first user a protected message by encrypting the message using the first user's public encryption key. The first user then decrypts the message using their private decryption key. The two keys are different, and it is not possible to calculate the private key from the public key. In most applications, the message is encrypted with a randomly generated session key, the random key is encrypted with the public key and the encrypted message and encrypted key are sent to the recipient. The recipient uses their private key to decrypt the session key, and the newly decrypted session key to decrypt the message.

Digital signatures are provided by key pairs as well, and provide authentication, integrity and non-repudiation. In this case a sender signs a one-way hash of a message before sending it, and the recipient uses the senders public key to decrypt the message and verify the signature. When signing large documents it is known to take a one way hash function of the plain text of the document and then sign the hash. This eliminates the need to sign the entire document. In some cases, the digital signature is generated by encrypting the hash with the private key such that it can be decrypted using the signers public key. These public/private key pairs and associated certificate key pairs may be computed using hard to reverse functions including prime number and elliptic curve techniques.

One-way Hash Functions are small pieces of data that identify larger pieces of data and provide authentication and integrity. Ideal hash functions cannot be reversed engineered by analyzing hashed values, hence the 'one-way' moniker. An example of a one-way hash function is the Secure Hash Algorithm.

X.509 and PGP each define standards for digital certificate and public key formats.

Various encryption algorithms such as RSA, Advanced Encryption Standard ("AES"), DES and Triple DES exist. RSA is a commonly used encryption and authentication system for Internet communications.

Secure Sockets Layer ("SSL") creates a secure connection between two communicating applications. For the purposes of the disclosed embodiments, SSL and Transport Layer Security ("TLS") are equivalent. These protocols are employed by web browsers and web servers in conjunction with HTTP to perform cryptographically secure web transactions. A web resource retrievable with HTTP over TLS is usually represented by the protocol identifier "https" in the URI. TLS can and is used by a variety of Application protocols.

Secure HTTP (S-HTTP) provides independently applicable security services for transaction confidentiality, authenticity, integrity and non-repudiability of origin.

S/MIME and Pretty Good Privacy ("PGP") provide encryption and authentication for email and other messages, allowing users to encrypt a message to anyone who has a public key. Furthermore, a message can be signed with a digital signature using a private key. This prevents users from reading messages not addressed to them and from forging messages to appear as though it came from someone else.

Kerberos is a secure method for authenticating a request for a service on a computer network that does not require passing the user's password through the network.

Microsoft Passport is an online service that allows a user to employ their email address and a single password to create a unique identity. Microsoft Passport is manufactured by Microsoft Corporation of Redmond, Wash., USA.

Liberty Alliance Project is an alliance formed to deliver and support a federated network identity solution for the Internet that enables single sign-on for consumers as well as business users in an open, federated way.

Internet Protocol Security ("IPSec") secures IP traffic across the Internet, and is particularly useful for implementing VPNs. Point-to-Point Tunneling Protocol ("PPTP") is a protocol that allows entities to extend their local network through private "tunnels" over the Internet. This kind of connection is known as a VPN. Layer Two Tunneling Protocol ("L2TP") is an extension of the PPTP protocol.

The XML Signature syntax associates a cryptographic signature value with Web resources using XML markup. XML signature also provides for the signing of XML data, whether that data is a fragment of the document which also holds the signature itself or a separate document, and whether the document is logically the same but physically different. This is important because the logically same XML fragment can be embodied differently. Different embodiments of logically equivalent XML fragments can be authenticated by converting to a common embodiment of the fragment before performing cryptographic functions.

XML Encryption provides a process for encrypting/decrypting digital content, including XML documents and portions thereof, and an XML syntax used to represent the encrypted content and information that enables an intended recipient to decrypt it.

Web Services Security ("WS-Security") is a proposed IT standard that addresses security when data is exchanged as part of a Web Service. WS-Security specifies enhancements to SOAP messaging aimed at protecting the integrity and confidentiality of a message and authenticating the sender. It also specifies how to associate a security token with a message, without specifying what kind of token is to be used. It is designed to be extensible with future new security mechanisms.

A Media Access Control Address ("MAC Address") is a number that is appended to a digital message and provides authentication and integrity for the message.

Security Services

Figure 12:
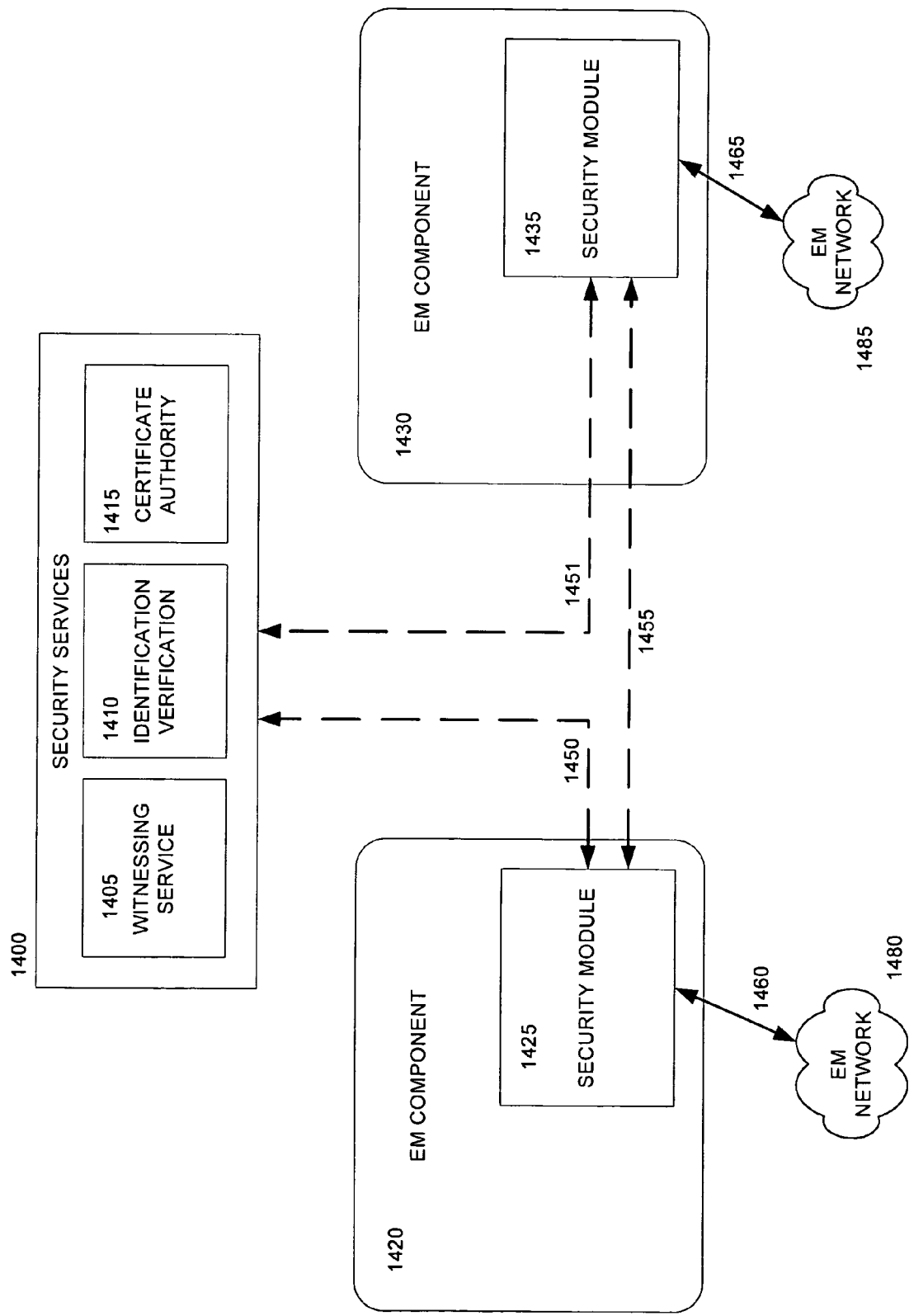
FIG. 12 depicts one embodiment EM system having various EM Components communicating and using Security Services.

Referring now to FIG. 12 various trusted Security Services 1400 exist to allow entities, systems or devices to communicate securely with one another and to provide access control to data and/or resources. These Security Services 1400 include such services as Witnessing Services 1405, Identification and Verification Services 1410, Certificate Authorities 1415, Certificate Revocation Services, Name Registries, Key Servers and Single Sign-On ("SSO") services such as Kerberos, Microsoft Passport and Liberty Alliance. These Security Services authenticate identity, validate and verify data integrity, provide non-repudiation, ensure contract signing, ensure signing of data by several parties where a signature is valid if and only if all parties sign the data.

Key Servers allow for public key and certificate exchange between various EM Components. The public key or certificate is published to a Key Server service or by the owner. The Key Server provides some sign-on mechanism. The Key Server can also provide certificate generation, key generation, installation certificates, revocation lists and Lightweight Directory Access Protocol ("LDAP"), or these functions can be provided by another security service. Certificate revocation lists are frequently exposed via LDAP and certificates can be revoked by EM devices in a secure fashion to prevent antagonists from revoking other's certificates. These revocation means include SOAP, HTTP, email, etc.

Devices can exchange their public information including identity and public keys with any entity they choose. It is often useful for a device to export a PKI certificate and/or public key so that recipients can use them for security operations later. Sometimes, the certificate or public key is sent in every message to simplify processing by the recipient.

It will be appreciated that although Security Services 1405–1415 are depicted bundled together under the general Security Services 1400 umbrella, that these Security Services 1405–1415 may be provided by one or more different organizations, and that Security Services 1405–1415 are shown bundled together for simplicity. Security Services 1405–1415 can be provided by EM Device or EM Software manufacturers, device or software owners, or by Trusted Third Parties ("TTPs").

EM Component 1420 contains a Security Module 1425, and EM Component 1430 contains a Security Module 1435. Security Modules 1425, 1435 provide similar functionality as the Security Module described in the aforementioned co-pending application. It is desirable for EM Components 1420, 1430 to communicate securely with one another. However, Security Modules 1425, 1435 require certain witnessing, identification, certification revocation lists, verification and authentication services. Therefore, EM Components 1425, 1435 are configured to use Security Services 1400 when communicating with one another. Alternately, EM Components 1420, 1430 use security services to implement system level security functions during communications or message processing. For example, EM Component 1420 may implement a security service to verify data sources from a system of devices.

Alternately, Security Module 1425 is directly programmed with security data. For example, Security Module 1425 is programmed or supplied with the public key or PKI certificate of EM Component 1430 and thereafter trusts that data signed by EM Component 1430 is in fact sourced by EM Component 1430. Such a relationship may be necessary if EM Component 1420 is unable to access Security Services 1400. Alternately, if Security Module 1425 is in possession of the PKI certificates of trusted CAs and trusts that those certificates are accurate, when it receives a certificate from EM Component 1430, it can use PKI techniques to see if that certificate is warranted by a trusted CA to be for EM Component 1430, and if the certificate is warranted, it can use the technique described above to decide when to trust data apparently from EM Component 1430.

Security Module 1425 is linked via channel 1450 with Security Services 1400, and via channel 1455 with Security Module 1435. Security Module 1435 is linked via channel 1451 with Security Services 1400. It will be appreciated that channels 1450, 1451, 1455 may be encompassed in the same network, and that the channels may be direct links, or may incorporate several intermediate servers, routers, firewalls, application gateways, protocol gateways, physical delivery mechanisms, and so forth that are presently omitted for clarity. It will be appreciated that entities exchanging data may comprise communication endpoints and/or loosely coupled applications that are not aware of the communications infrastructure.

Identifying EM Components

Before EM Components can communicate securely with one another they need to be provided with identities. The identity must not be easy to assume either intentionally or accidentally. Identities for EM Components also provide a guarantee or an assurance that EM data comes from a given source EM Component and has not been tampered with or corrupted.

Identities are particularly relevant in multi-site scenarios, where EM data is aggregated across a wide geographic area containing multiple sites, serviced by multiple utilities, each site operating on one or more utility rates. Each EM component in the system needs to identify itself, particularly when reports are run across multiple databases or against aggregated data, or when the EM data has financial implications. In this case, before data from an EM component is inserted into a central storage location the EM component will be identified and a check will be made to see if its data is already in the central storage and if so it will not be inserted again. Furthermore, in order to take advantage of third party services, EM components need a way to identify themselves to Web services or the world in general in a standard and easy way. Identity can be used both to authenticate a user and also to provide access control to resources.

This identity can be implemented using various values, including MAC address, Universal Unique Identifier ("UUID"), TCP/IP address, DNS name, email address, serial number, a unique string of characters issued by an authority, such as a URI, a device type, a name or an identifier of one or more authorities.

A UUID is a 128-bit number or a representation thereof that can be used to identify components. The possibility of duplicate UUIDs being generated by the well-known UUID algorithms is so remote that UUIDs are considered unique.

An SSO service such as Microsoft® Passport, Liberty Alliance, Kerberos, XML Web Service, or a manufacturer hosted identity server can be used to assign identity. Microsoft® Passport uses email addresses to identify users, including EM devices. XML Web services implement signatures and encrypted data using XML Signing and XML Encryption. Most of these systems do not require the disclosure of a password by the EM device. Communications with them can be made secure by using any one of TLS, SSL, IPSec, VPN, or other communication endpoint protocols that have security built in. Once the identity is assigned, the EM component can access other resources to which it is authorized, send or receive verifiable data to or from other devices, and may provide access to other entities of its own resources. The EM Component can use a SSO or public key to be assigned new keys and certificates or to publish new public keys and certificates it has assigned itself.

When email addresses or URIs that are URLs are used to identify EM Component 1420, EM Component 1420 has the ability to receive messages at the corresponding email address or URI and respond to the sender. This provides a basic way to deliver or retrieve secrets from EM Component 1420. This basic security arises from the fact that it is somewhat difficult to intercept messages to named devices within a short timeframe.

Assigning the Identity

It is imperative that no EM components have the same identity, so when two or more entities or authorities are assigning identifiers to EM Components, it is possible that the same identity will be assigned to different EM Components. It is therefore preferred that the entity or authority name be a significant portion of the identity. A process of inserting an identity in all EM Components at manufacturing or repair time provides a useful identity for further use by parties involved in exchanging EM data in a secure fashion.

To protect its identity, EM Component 1420 should store the identity in a location that cannot be easily accessed or replaced. A poor place to locate the identity would be on a card that can be moved from one component to another, such as an Ethernet card. In one embodiment, the identity is located in the EM Component 1420 firmware, protected by a mechanism that detects corruption or tampering of the device identity. In a second embodiment, the identity is stored in a dedicated, secure area of memory. Security Module 1425 manages the integrity of the identity.

In one embodiment, EM Component 1420 is assigned two pairs of one private key and one digital certificate each during manufacturing. The certificates are signed by the manufacturer and contain various items necessary for PKI infrastructure including the device identity. The first key/certificate pair is a signing private key (the device identity signing key), and verification certificate (the device identity verification certificate), which are used to sign and verify EM Component 1420 data. The second key/certificate pair is a decryption private key (the device identity decryption key) and an encryption certificate (the device identity encryption certificate), used for encryption and decrypting EM data published by EM Component 1420. In one embodiment, the same key pairs and certificate are used for signing and decryption. Alternately the two keys are stored only on EM Component 1420. The two certificates are stored on EM Component 1420 and also on a mission critical server provided by the EM device manufacturer as Security Service 1400. If EM Component 1420 fails or is stolen, the certificates can be revoked through interaction with the Security Service 1400. Any signed data from EM Component 1420 can be verified by checking the signature against the document and the certificate against the certificate authority provided by the manufacturer. Now EM data published by EM Component 1420 can be verified separately from the message and protocol transporting the EM data.

PKI certificate based authentication schemes are better for machine-to-machine authentication. In this case, EM Component 1420 is issued one or more PKI certificates, associated identities and identity-related secrets, such as private keys, during manufacturing. This eliminates the need for EM Component 1420 to use an authentication service such as Kerberos. EM Component 1420 need never send a password or other identity-related secret. This provides for a more efficient implementation on EM Component 1420 and a simpler overall system, as EM Component 1420 does not need to interact with Security Service 1400 during operation. Instead, EM Component 1420 signs data using its private key.

Alternately, an identity and certificate are assigned by an authority unrelated to the device manufacturer and transferred to EM Component 1420 in a manner that keeps all secrets private. This can be accomplished by using a secure protocol, a network on which antagonistic traffic will not be present, or by installing physical hardware on EM Component 1420 that already has a certificate and identity related secret on it. Multiple device identity and/or certificates can be assigned to EM Component 1420 by one or more authorities.

In the above embodiments the identity related secrets are assigned to the device. In an alternative embodiment, EM Component 1420 generates its own key pairs with an algorithm and provides the public key to an authority. The authority generates a PKI certificate that it provides to EM Component 1420.

Device Identity Versus Metering Point Identity

Where EM Component 1420 is an EM Device or EM Gateway, there is often a need to distinguish between the identity of the device and the identity of the metering point that device is measuring. The device identity could be the serial number, serial number/device type combination, MAC address or UUID assigned to the device, whereas metering point identity relates to the physical location where the device is installed or the specific purpose of the device. A consumer of data from the device wants to be sure that the data they are receiving purportedly from that device is in fact from that device (guaranteed by device identity) and also from the physical location (guaranteed by metering point identity) the device was installed at. It will be appreciated that in some cases a single EM device may be metering multiple points. In the case where there are multiple users of the EM data, every user needs to trust that the data they are receiving is reliable, and has not been tampered with by another user. For example, it would be fairly easy for the antagonist to commit fraud or other forms of havoc, including financial or even grid operational by using a rogue device.

This problem can be solved by issuing EM Component 1420 two identities and associated security password or key pairs/certificates, usually issued by two different authorities, one for device identity and one for metering identity. Each authority is a CA or SSO, and must be trusted by all users of data from the device. The authority for the metering point ensures that there is only one device with an identity for a particular metering point. This provides a mechanism for the authority to guarantee to their users which devices are associated with specific metering points and for users to verify data coming from a device is in fact from that device. To verify the data is from a particular device and a metering point, the data must be verified using both security systems. EM Component 1420 provides an interface that allows it to be assigned a password and/or key pairs and certificates and metering point identification. In one instance, both systems are PKI and the device signs the data with two different private keys, one from each PKI. A recipient uses both signatures to verify that the device and not a rogue antagonist sent the data, and that the device is associated with the correct metering point.

In an alternate embodiment, a seal is applied when EM Component 1420 is installed at the metering point. This seal guarantees that the device has not been moved from that point. This seal can be as simple as a switch that is automatically opened when the device is removed from a socket. Once the switch is opened, the seal is broken. If it is moved for any reason, either unintentionally or maliciously, the seal is broken, and the Security Module 1425 revokes access to the metering point from the authority. The metering point identity can be either disabled or erased.

In an alternate embodiment device removal can be detected through an embedded global positioning system ("GPS") installed in the device. Furthermore, as device downtimes and outages in various areas are usually known, device downtime can be correlated with known power outages in that area. The comparison could happen at the authority or on the device depending on who sends outage/downtime data to whom.

Identity Name Registry

A name registry maintains a database of device identities, associated EM devices, and the times at which they entered and left service at a specific metering location. For example, EM Component 1420 is assigned an identity, and recipients of EM Component 1420 data, such as EM Component 1430, can easily verify the source of the data, and that the certificate is a currently valid certificate issued by the EM Component 1420 manufacturer, by using PKI techniques. EM Component 1430 maps the EM Component 1420 URI to the Metering Point URI either by using a secure service, typically an XML Web Service, provided by the registry owner as a Security Service 1400, or by using a local copy of the registry it has previously retrieved. Where an EM device vendor does not provide or comply with a known URI scheme, the owner of the name registry could define a URI scheme for the vendors' equipment, as long as the EM device has a set of identifying attributes such as MAC address or serial number. The registry must be updated whenever an EM device is brought into or removed from service. The registry may be implemented as a distributed registry with a host name encoded within the Metering Point URI corresponding to a registry for that particular host. Alternatively, the registry can be implemented as a single large database. The registry can be implemented as a relational database, XML files, Comma Separated Value ("CSV") files, or Resource Description Files ("RDF"), or any mechanism that allows associated lookup when combined with the appropriate software. The registry enforces uniqueness of metering point URIs, thereby preventing two devices from having the same URI at the same instant. In the case of the distributed registry, a registry server would be placed on the host. The best way to update the registry is using web services that employ some form of security typically used with web services, like Kerberos or a PKI scheme employing PGP or x.509 certificates. Various techniques can be applied to ensure that the registry remains up to date, including requiring device owners to update the registry within a business day of exchanging the EM Component 1420 at a metering point. The registry could also report errors and changes, allowing reports to be re-run with the up to date information. When the registry changes, notifications can be communicated to entities needing to know about the updates. Some good techniques to do this comprise: email, USENET/NNTP, HTTP, TLS, SSL, S/MIME, RDF, Rich Site Summary, RDF Site Summary, Really Simple Syndication, or CSV. This scheme easily supports the replacement of installed EM devices that were assigned a specific metering point identification and removed because they failed, were upgraded to better versions or were sent for scheduled testing to ensure they are still reading correctly.

Encryption, Authentication, Integrity and Non-repudiation

When two entities, particularly unrelated entities, share information, such as significant EM Data, including data that has economic consequences such as energy profiles, WAGES profiles, revenue data and so forth, the entities want to be sure that the transmission is private and/or the recipient of the data can trust the source and the content. When an EM Device receives data such as a control command, or economic data such as pricing information, it is critical that the device can authenticate the sender and be sure of the integrity of the data.

Servers will frequently archive, forward or embed the contents of an encrypted or signed message, losing the encryption and signing in the process. In some cases, a first piece of verifiable data is sent to a first destination, and some action such as aggregation or calculation is performed using the data to produce a second piece of data. The two pieces of data are now sent to a second destination, and the recipient wants to verify that neither piece of data has been tampered with. Various techniques can be employed that allow for the archival, forwarding and embedding of EM data while retaining a way to verify that the data source is authentic and that the data has not been tampered with. Such techniques will be discussed in greater detail below.

Encryption provides privacy by preventing anyone but the intended recipient of a message from reading it. Encryption can be provided point-to-point, or end-to-end, depending on the nature of the channel and the data. Only a portion of the data may be encrypted. EM Components can encrypt messages using encryption schemes such as PGP, S/MIME, XML Encryption, or SSL.

Signing data provides assurance that the data comes from the desired source, and that it has not been tampered with. Signing helps prevent so-called "man in the middle" attacks where someone with legitimate or illegitimate access to data intercepts the data and tampers with it or forges data. This can occur with all aspects of communication, including installing certificates, and exchanging frameworks and all types of EM data.

Non-repudiation prevents the sender from denying that they sent a message. Non-repudiation can be provided by signing, electronic witnessing and technologies that assert a document was read before it was signed. Similar techniques exist for ensuring non-repudiability of contracts. Where EM Component 1420 is an EM Device, EM Component 1420 can sign data, data packets or messages using PGP, S/MIME, XML Signature or TLS/SSL to provide for non-repudiation of those messages or data.

Where EM Component 1420 is an EM Device, computing cipher data and transmitting signed data can be computationally too expensive to perform in real time, or require too much memory. Cipher data includes hashes, digital signatures, and encrypted data. There are several ways to reduce these costs or amortize them over time.

In one embodiment, Security Module 1425 compresses the data before calculating the cipher data, and the cipher data recipient decompresses the data before reading it. The cipher data, which may be compressed data, is generated incrementally in advance of the need to send it. This is very useful when the data is being generated over a long period of time. When it is time to send the cipher data, it is already computed. If the cipher data is a security hash, the data is streamed out to a buffer or register in the format that it will be signed and sent as, the data is used in the computation of the digest or hash value, and the data is thrown away. A variety of buffer sizes can be used, and the frequency of updating the hash can vary as well. When the data needs to be sent to a recipient, the signature is already calculated and EM Component 1420 streams the data without performing any potentially expensive hash functions and includes the pre-calculated data according to the security scheme. The data and signature can be encoded according to S/MIME, PGP or various other formats. This technique is useful for higher-level protocols or formats, like S/MIME, PGP, or XML Signature, because the plaintext doesn't incorporate time varying or packet based protocol information. In contrast, lower level protocols like IPSec may incorporate protocol information that cannot be computed in advance in the plaintext, so the cipher text cannot be computed as far in advance.

In an alternate embodiment, the process is modified to stream canonical XML or some other format compatible with XML signing to the buffer so that the signature will be compatible with the XML signing specification of the World Wide Web Consortium ("W3C"). The actual XML transferred to a recipient may be formatted differently from the format used to generate the signature, but the recipient can still verify the signature by transforming the received XML to the format used for the generation of the signature. In this case, XML Signature can be used to authenticate the signature or hash. This strategy makes it possible to generate authenticable load profiles in advance without using much memory, which can be quite valuable when EM Component 1420 has a slow processor.

In an alternate embodiment, messages are sent only occasionally. When the messages are processed-by an automated system and reports are only created every day, or week, or month, there is some leeway in when the data must be sent. In this case, encryption and signing calculations can be executed only when there is free processing time. This scheme works well on EM devices where important realtime calculations can take up to 100% of available calculation time for small periods, but over time periods of a few hours there is processing time to spare.

In an alternate embodiment, encrypted data is streamed across the Internet as it is generated using the aforementioned techniques. This has the advantage that EM Component 1420 does not need to store encrypted data.

In an alternate embodiment, EM Component 1420 contains a removable storage device that can contain EM data. This removable storage device may be removed from time to time to upgrade configuration data, or to download stored data. The EM Component 1420 may be fitted with a physical lock that prevents unauthorized individuals from taking the removable storage device.

Signing

EM Component 1420 transmits a message to EM Component 1430 that contains the data or encrypted version of that data that is being exchanged in a secure fashion. The message may also contain a public key, a PKI certificate, and one or more message digests, which are electronic signatures.

In one embodiment, this signing is implemented using XML signing technology. XML signing technology allows the signing of a portion of an XML document by various parties. An XML document can contain a signature that references portions of the signed document; that is, the data and the signature are in the same document. To allow for verification, EM Component 1420 produces an XML document with EM data and a signature of the EM data. This XML document can now be verified separately from the transport mechanism that it was delivered with. Because the document is an XML file it can be processed with typical XML software tools such as Extensible Stylesheet Language ("XSL") and Document Object Model ("DOM"). The document can be archived or embedded in another document while maintaining the verifiability of the signature. This can be of particular value when the document contains energy readings and a bill for that energy. The bill receiver will have confidence that they are being billed for the correct amount of power consumed.

Alternate means for providing signing include employing S/MIME, PGP, using XML Signature in a manner compatible with the WS-Security SOAP format, signing a row of data when the data are tabular or where the data is in rows, signing a tuple of each datum and the time associated with that datum, storing the signature in one or more fields or registers in a register or binary based protocol such as those used by MV90, MODBUS® or ION®.

In an alternate embodiment if the data and/or hash are not XML, the signature or message digest can be created by appending the fields together in some manner including but not limited to: appending the bytes of the fields together; converting the data to a form of XML and using the XML Signing techniques; converting to CSV and then signing the rows. It will be appreciated there are many ways to do this.

Entities with different identities can sign different data. For example, an entity may sign a SOAP message indicating that the sender is a particular device authorized to send data to the receiver, and the signer of data within that message may be the entity that actually measured that data. One instance when this is useful is when secure data is gathered from a device, the data is stored and sent to another system later on.

In operation, before EM Component 1420 transmits a message to EM Component 1430, if it does not already have in its possession the public key of EM Component 1430 it requests it from Security Services 1400 via channel 1450. Security Service 1400 returns the public key of EM Component 1430. Security Module 1425 encrypts the message using the EM Component 1430 public key, signs the message using the EM Component 1420 private key and transmits the message over channel 1455 to EM Component 1430. Security Module 1435 now requests Security Services 1400 for the public key of EM Component 1420 via channel 1451. Security Services 1400 returns the public key of EM Component 1420 via channel 1451. Security Module 1435 decrypts the message using it's own private key, and uses the EM Component 1420 public key to verify the integrity of the received data. It will be appreciated that public keys are typically represented by means of certificates that encapsulate the key and other information that a CA warrants about the owner of the certificate. It will also be appreciated that one or more parts of the message described above may be encrypted or signed.

In an alternate embodiment, EM Component 1420 and EM Component 1430 may cache the others public key in a safe place, and refer to that when encrypting and verifying, only checking in with the Security Services 4100 on a periodic basis. This reduces traffic and the need for a connection to the Security Services 1400, and speeds up the verification process.

In an alternate embodiment, where EM Component 1420 and EM Component 1430 are communicating via email, a certificate is attached with the message.

In an alternate embodiment, EM Component 1420 and EM Component 1430 each send a certificate to the other party before starting to send signed messages.

In an alternate embodiment, EM Component 1420 is transmitting HTML to EM Component 1430. Once again there is a need to protect the content of the transmissions between the two components 1420, 1430, and to verify the source of the data. Current designs implement this security at the transport level using SSL. This solution is problematic however, as SSL is processor intensive and is also encrypted and not cacheable by proxy servers. Instead, the XHTML data is signed using XML signing techniques described by the W3C. An XHTML module can also be provided if one is not publicly available to represent the signature in XHTML in a specific way. Then a browser plug-in may be created if the browser vendor does not support XHTML or XML signing. In this case the HTML data is signed, allowing standard PKI techniques to be used to verify the HTML data is from the source it claims to be and that the data has not been tampered with. If the HTML document is then saved, it remains verifiable, as the signature remains intact and valid. The HTML document can be cached in a proxy server for efficient system deployment.

A stand-alone message may be carried through a variety of transports and protocols as it travels from EM Component 1420 to EM Component 1430. The message may even change format; for example, the same XML Infoset can be represented in different serializations such as canonical and WBXML. In a message such as an XML or SOAP message, the authentication token may only authenticate a portion of the message, or the entire message.

In an alternate embodiment, any stored data, including cached data and data stored in a database, is tagged with a digital signature. When the data is retrieved, the digital signature can be used to verify that the data has not been tampered with over time.

In an alternate embodiment, where EM Component 1420 is an EM device, EM Component 1420 is producing a series of periodic readings of various parameters. Based on the readings and the time, a digital signature is produced and placed in the recorder, possibly as another channel. In this context, a channel is a column in the recorder, the column having a defined meaning. Alternately a row in the recorder is used to store a signature of a predefined number of previous rows. The EM data and signatures are retrieved and stored in a central data collection or billing system on EM Component 1430. An application validates that the readings are authentic and flags the ones that are not. For added security, Security Module 1425 can also encrypt the data before transmitting it. The EM data and signatures can be regenerated from the database to verify the provenance of the data at a later time.

In an alternate embodiment, the EM Component 1420 private key is used to sign firmware or frameworks or a hash or digital signature thereof after they are installed on EM Component 1420. EM Component 1420 occasionally verifies the signature to ensure that the firmware and/or framework has not been tampered with or corrupted. One advantage of using a signature over a CRC check or other one-way function is that an antagonist will find it very difficult to forge a signature whereas they could forge a CRC after tampering with the firmware.

Measurement Assertion Techniques

A consumer of data may wish to verify that received data represents what the data provider claims it represents. It is difficult for a user to confirm the calculation techniques, source registers and source modules used to arrive at a value, so some techniques are needed to aid in this.

Where EM Component 1420 is an EM device, EM Component 1420 produces values based on registers or modules. These registers or modules typically have no indication of the measurement they represent. The vendor and/or technician who configured EM Component 1420 affirms that the register or module value asserts a particular measurement. To ensure that the consumer of that value knows that they are getting the asserted measurement, some fundamental information about how that measurement is produced is provided. This information is digitally signed by the asserter so that the consumer knows the identity of the entity making the assertion, and the technique used to calculate the measurement. This description may take the form of an XML document. A method of verifying that this set of registers or modules is in use in the actual device providing the measurement is also necessary.

In a related scenario, the consumer of EM firmware or frameworks requires confidence that any firmware or frameworks they are uploading to EM Component 1420 have not been forged or tampered with, and that they are released, supported versions. Signatures and certificates are either included in the firmware or framework file, or in a file separate from the firmware or framework. The certificates are revoked if there is a product hold on the firmware, or if it is out of date. The firmware upgrade program warns the user not to upgrade firmware that is unsigned, or firmware whose signing certificate has been revoked. A list of valid and revoked certificates is stored on a mission critical server, which may be provided by the device manufacturer as a Security Service 1400.

Software may check for valid signatures before an upload is attempted, and only allow certain users to upload unverified firmware. The firmware itself may verify signatures to ensure firmware has not been tampered with and is from an authorized source, and that the entity attempting the upgrade is authorized to perform an upgrade. Third parties may upload their own firmware written in their language of choice, such as Java, Prolog, Haskell, binary executable code, C#, ECMA Common Language Runtime ("ECMA CLR"), or ION® Object Configurations. Depending on the platform, source code or some repurposed version of the source code (i.e. ECMA CLR or target processor machine code) is digitally signed by the party and uploaded. Such code would be allowed to perform only specific actions based on trust level of the signer. For example, unsigned code or code signed by a non-trusted entity might only be allowed to read registers. A subsystem would prevent the client's code from performing invalid operations, such as accessing memory it shouldn't. That may require that the compiled code is Java, or ECMA CLR code that the subsystem can prove is not damaging. Allowing binary code to be deployed may not be automatically verifiable, in which case only trusted users may be allowed to upload it.

In an alternate embodiment, a framework designer designs forms that framework operators will enter values into while programming EM devices. The framework has a built in form allowing the framework or specific configuration values within the framework to be changed. The forms may be built with various technologies, including HTML, XFORMS, or XML E-Forms developed by PureEdge Solutions of Victoria, BC, Canada. The framework designer signs the framework using PKI techniques and arranges for a timestamp from a Security Service 1400. A template is created from a framework, using the framework and an optional firmware specification. A framework operator enters values onto the forms, signs and uploads the framework or template to EM Component 1420.

Any entity receiving EM data from EM Component 1420 can't be sure if they should trust the data. Each message they receive from EM Component 1420 contains a template signature from the framework designer, a signature about the configuration by the framework operator, the message contents (such as load profile), and a signature from EM Component 1420 that verifies that it created the message contents, and that it has verified that the framework operators' signature matches the configuration uploaded by the framework operator, and that the template signature by the template designer matches the template on the EM Component 1420. The recipient can verify the message by comparing the signatures by the framework operator and framework designers of the configuration parameters and template to the expected signatures, and verify the message signature by EM Component 1420 is valid and from a trusted source. This strategy provides non-repudiation of the framework design, the configuration of EM Component 1420, and of EM data from EM Component 1420. A typical application for this is in Utility Meter Shops.

In an alternate embodiment, where EM Component 1420 is an EM device, the consumer of data (EM Component 1430) knows and approves of certain device configurations for EM Component 1420 that include the firmware, software, configuration parameters, and frameworks. EM Component 1420 produces a value representing the configuration using a known algorithm of its configuration, and the recipient EM Component 1430 generates a value using the same algorithm using an approved configuration for EM Component 1420. This value is a fingerprint of the device configuration. Functions suitable for generating such fingerprints typically have the property of easy computation of the value, while being hard or impossible to compute the input from the value and being collision resistant, that is, it is hard to find two inputs that have the same fingerprint value. The data EM Component 1420 sends is in some way combined with the fingerprint value and then EM Component 1420 signs this aggregate before sending. In another embodiment, a hash of the data and the fingerprint token are combined, and the signature is generated based on the combinations of these two security tokens. In another embodiment the fingerprint is appended to signed data and is signed again or vice versa. In another embodiment, the device configuration itself is used as its own fingerprint. It will be appreciated that there are many ways of securing this transaction. The receiver, EM Component 1430, of data can now employ PKI techniques to verify both that the data has not been tampered with and was generated by EM Component 1420 while in an approved configuration.

In another embodiment, EM Component 1430 is not concerned about approved device configurations; it simply wants an assurance that something that is purported to be a measurement is in fact that measurement with some chain of accountability. For example, if A can be trusted as honest, and 'A states "B has value β" can be trusted, then EM Component 1430 can believe that B has value β. A statement like "B states t" can be trusted by a receiver of such statement from B by verifying an electronic signature of B. If it turns out B is lying, B can be held accountable later on.

Statements can be made by PKI certificate issuers about the identity and trustworthiness of those receiving certificates to perform certain actions. Owners of such certificates may make assertions about other entities such as devices, companies, or people. Those assertions may be more along the lines of security assertions like the ability to issue certificates to certain other entities, or other things, like trusted to create or configure device firmware or device configuration parameters. If the recipient of EM data is provided the set of assertions and a set of rules of when to trust statements, then that recipient can decide whether EM data received from an EM Device should be trusted. It will be appreciated this can be complex, as statements may include statements about further reifications. This inference process can be combined with the process of verifying that certain firmware or configuration or certain subsets thereof were used to generate the EM data.

Federated Security

Two or more applications or organizations (NAEs) don't fully trust one another, but wish to share some EM data and resources. These NAEs identify users with a federated security scheme that may be based on Kerberos, which allows users from one NAE to be identified to another NAE. Web service security can be combined with federated security based authentication and access control to provide for secure exchange of EM data between users of different NAEs.

Federation is a technology and business agreement whereby users (including non-human users such as EM devices and EM software) that are part of a single or separate organization are able to interact through a system of authentication that allows for distributed processing, data sharing and resource sharing.

In one embodiment, EM Component 1420 is a computer running EM software, that needs to retrieve EM data from EM Component 1430, which is an EM device owned by an NAE. The EM software is authorized to retrieve certain types of EM data from EM Component 1430. EM Component 1420 creates a communications link 1455 with EM Component 1430. The EM Software requests some data and EM Component 1430 uses a PKI signing scheme to sign the data before sending it. In this fashion any user can be confident of this data's provenance.

These schemes provide authentication of data source and integrity between applications and users in different organizations while limiting access to resources between private networks.

Security Godfather

As described in the aforementioned co-pending application, there are various reasons including cost and legacy equipment that might prevent some EM Components in a system from having their own security module. Referring again to FIG. 1, the Security Module 1425 of EM Component 1420 provides access through channel 1460 to Security Services 1400 for the EM Components (not shown) located in EM Network 1480, and Security Module 1435 of EM Component 1430 provides access through channel 1465 to Security Services 1400 for the EM Components (not shown) located in EM Network 1485. EM Networks 1480, 1485 can be made more secure using physical security techniques.

Integrated EM Security System

Although protecting components and channels of a network and system is important, the key is to tie the various security mechanisms together into an integrated, secure EM System. The security of a system is only as strong as the weakest link, so placing security features on various components in a system and leaving other components exposed opens the system to attack. It is necessary when designing and configuring a system to consider all components and how they interact.

In a naïve system a single perimeter may be erected around an EM System, designed to keep unauthorized users and problems out. However, this system will be ill-equipped to handle attackers that have managed to bypass the external perimeter, and users with malicious intent who are authorized to access components within the perimeter. Instead of a single perimeter protecting an EM System, multiple layers of security are needed, where an authorization must be produced to gain access to various areas. This authorization is managed by the security system once a user has logged on. Setting up specific access levels for accessing various parts of the system and assigning access levels to each authorized user helps to prevent malicious intruders or employees, or misguided employees from creating havoc.

Figure 13:
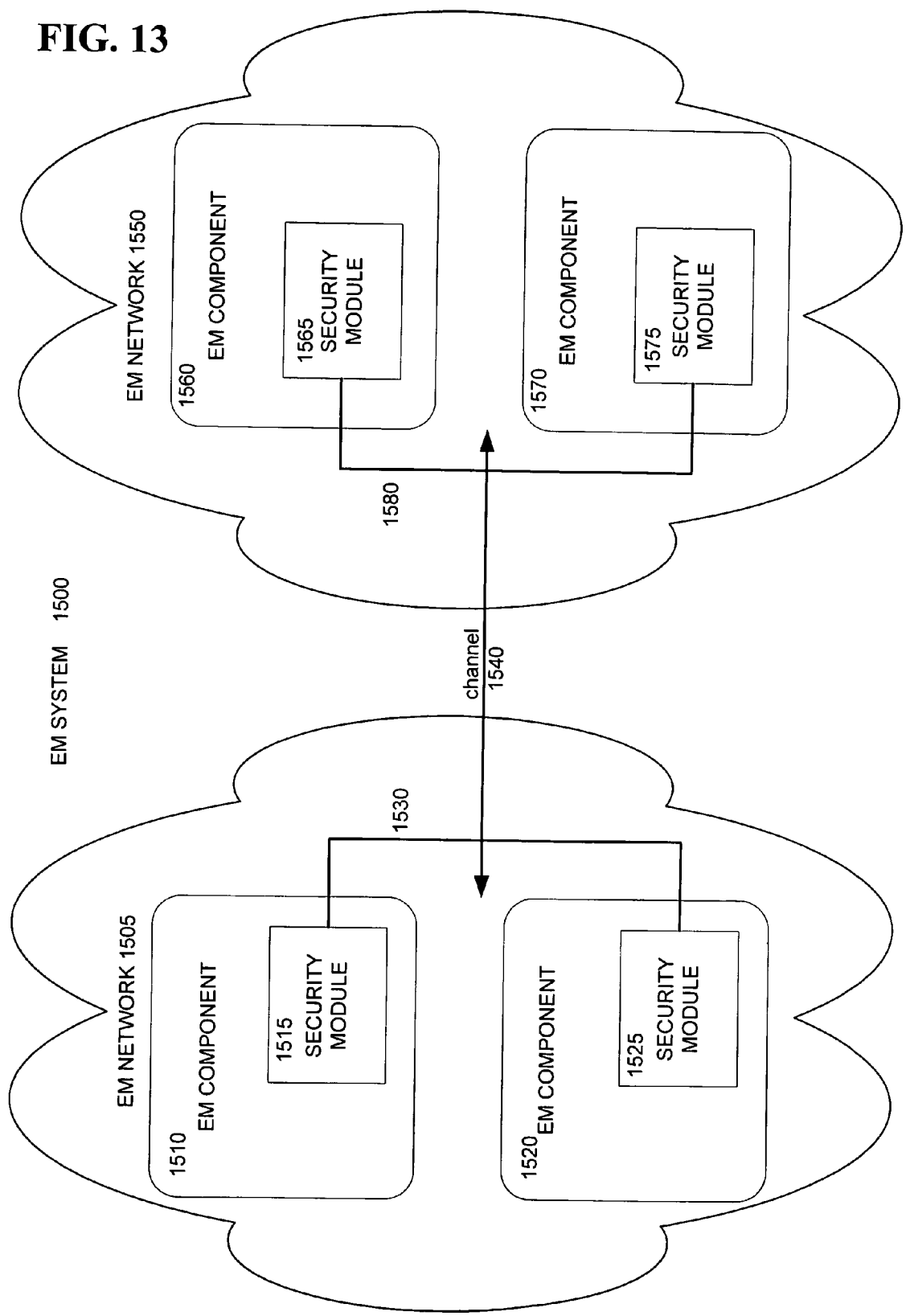
FIG. 13 depicts another embodiment of an EM System.

Referring now to FIG. 13, EM Components 1510, 1520 each contain a Security Module 1515 and 1525 respectively. Security Modules 1515, 1525 communicate via channel 1530. EM Components 1510, 1520 together form an EM Network 1505. EM Components 1560, 1570 each include a Security Module 1565 and 1575 respectively. Security Modules 1565, 1575 communicate with each via channel 1580. EM Components 1560, 1570 together form an EM Network 1550. EM Networks 1505, 1550 communicate with each over via channel 1540. Security Modules 1515, 1525 of EM Network 1505 are able to communicate with Security Modules 1565, 1575 of EM Network 1550 via channel 1540. EM Network 1505, 1550 and channel 1540 form an EM System 1500. EM System 1500 allows disparate users to communicate and access remote resources in a secure fashion. It will be appreciated that EM Network 1505, 1550 may contain additional EM Components not shown in this figure and that EM System 1500 may contain additional EM networks not shown in this figure.

It will be appreciated that components in this system can be separated by network boundaries, perimeters, firewalls, servers, router, communications links, and protocols that are omitted here for clarity. However, EM components can send data to one another without worrying about intermediaries that the data passes through. Some EM Components have user interfaces and direct user access, whereas others may only be available via remote access. Not all EM Components have a Security Module, some may be inherently secure based on physical location and other factors, or may receive security services from other EM Components. In some cases, rather than distributing security modules across a system, it may make more sense to provide a security server that manages security for a whole system.

Security Modules 1515, 1525, 1565, 1575 protect the system, detect that there is an attack or intrusion, and react appropriately to the attack. They are capable of sharing security information with one another. They can share logon and permissions, report security breaches, manage perimeter security, analyze an attack, identifying the location and what is affected, take some defensive action and provide security for both local and remote EM devices.

In one embodiment a database that includes access rules for users is integrated into the EM System 1500. This database could be stored on a server (not shown), which is accessible by Security Modules 1515, 1525, 1565, 1575. This database centralizes and simplifies user authentication and management of user/access privileges by including rules about who can do what, and only allowing certain users to do certain things. Keeping this database up to date is important, so that it mirrors all changes in employment status and responsibility level.

In an alternate embodiment, a limitation is placed on those who can access a system remotely.

In an alternate embodiment, access control rules are enforced between all components, with pre-defined rules of which components can communicate with which other components, and what they are allowed to communicate.

In an alternate embodiment, a distributed firewall is implemented; this entails placing the firewall on the various components of the system, rather than at the perimeter of the network.

In an alternate embodiment, one or more VPNs are employed to provide additional security.

In an alternate embodiment, EM System 1500 incorporates integrated sub-systems including cameras, biometric authentication, smartcards, access tokens and other types of security devices. These devices may be implemented on one or more Security Modules 1515, 1525, 1565, 1575. Security Modules 1515, 1525, 1565, 1575 share security information with one another. For example, a user could log onto EM Component 1510 either locally, or remotely from EM Component 1560. Based on the access rights pre-assigned for that user, they may be able to access various resources and controls on other EM Components 1520, 1570 in the EM System 1500, without logging on to those components. Alternately, that user may be prevented by accessing any components and resources in EM System 1500 because they could not correctly authenticate. Access tokens, smart cards and biometric authentication prevent users from inadvertently revealing their passwords.

In an alternate embodiment, EM System 1500 implements an Intrusion Detection System, perhaps on one or all of Security Modules 1515, 1525, 1565, 1575, that is able to detect an attempt to compromise the integrity of the system. The identification of unauthorized attempts can be implemented by monitoring patterns of access and behavior on individual EM Components 1510, 1520, 1560, 1570, on EM Networks 1500, 1550, or on an entire EM system. Methods of monitoring include supervising network traffic and analyzing it for unusual activity and access attempts, using rules that determine who can access what, using statistical or artificial intelligence techniques, reviewing system, event or audit logs looking for anomalies, or some combination of these methods. The Intrusion Detection System has the capability to take remedial action such as publishing an alarm, shutting down the system, logging the attack, and reporting the attack to a central server or pager. The Intrusion Detection System may choose to not respond to certain types of requests if it thinks it may be under attack, preventing the attacker from intruding further into the EM System 1500.

The Intrusion Detection System can employ various techniques such as honey pots and burglar alarms to distract or identify would be intruders. A honey pot is a part of the system that looks particularly attractive to an intruder, but in fact has been planted there for the purpose of gathering data about the identity of the intruder and what they want to do, without allowing them to access the real system. Burglar alarms are devices or pieces of software that alarm when they are accessed. They are positioned to protect sensitive applications or data, and may be configured to alert the whole system that it is under attack, or to contact an administrator.

The system creates an audit trail or event log of all security sensitive events, such as connection attempts, data upload and download attempts, and attempts to alter configuration settings. The event log records such details as timestamp, success of the attempt and address the-attempt was generated from.

It will be appreciated that the various security means previously described provide more effective protection when they are layered together, as the system becomes more difficult to intrude. For example, EM System 1500 can be protected by firewalls around each EM Network 1505, 1550, firewalls in various EM Components 1510, 1520, an Intrusion Detection system as discussed earlier, and the application of cryptography to all communications.

Business Process

A company provides a business process wherein the key business strategy is selling secure EM Systems. This could involve providing security services to EM device and software suppliers, owners or users. It can also involve providing security insurance against things such as data theft, viruses, intrusions, security breaches, loss of income resulting from the previous, and damages when confidential information is stolen.

It is therefore intended that the foregoing detailed description be regarded as illustrative rather than limiting, and that it be understood that it is the following claims, including all equivalents, that are intended to define the spirit and scope of this invention.

We claim:

1. An energy management device for use in an energy management architecture for managing an energy distribution system, said energy management architecture comprising a network, said energy management device comprising:

an energy distribution system interface operative to couple said energy management device with at least a portion of said energy distribution system;

a network interface operative to couple said energy management device with said network for transmitting outbound communications to said network and receiving inbound communications from said network, said inbound communications comprising first energy management data and said outbound communications comprising second energy management data;

a processor coupled with said network interface and said energy distribution system interface, said processor operative to perform at least one energy management function on said at least a portion of said energy distribution system via said energy distribution system interface, said processor further operative to process said first energy management data and generate said second energy management data as a function of said energy management function;

wherein at least one of said inbound communications comprises at least one secured inbound communication, said network interface further comprising a security module operative to selectively encrypt said outbound communications and validate said at least one secured inbound communication.

2. The energy management device of claim 1, wherein said at least one secured inbound communication is at least encrypted, said security module further operative to decrypt said at least one secured inbound communication.

3. The energy management device of claim 2, wherein said security module is capable of encrypting and decrypting using at least one of Secure Multipurpose Internet Mail Extensions ("S/MIME"), Extensible Markup Language ("XML") Encryption, Secure Sockets Layers ("SSL"), and Pretty Good Privacy ("PGP").

4. The energy management device of claim 2, wherein said security module is capable of selectively encrypting said outbound communications for decryption only by an intended recipient of said outbound communications.

5. The energy management device of claim 2, wherein said security module is capable of selectively encrypting said outbound communications for transmission over a portion of said network.

6. The energy management device of claim 2, wherein said secured inbound communication is further at least signed, said security module further operative to at least one of:
 a. prior to encryption, selectively sign said outbound communications;
 b. selectively sign said encrypted outbound communications;
 c. prior to decrypting, authenticate said at least one secured inbound communication; and
 d. after decrypting, authenticate said at least one secured inbound communication.

7. The energy management device of claim 6, wherein said signed encrypted outbound communications comprises at least one of a public key, a Public Key Infrastructure ("PKI") certificate, a message digest and an Extensible Markup Language ("XML") signature.

8. The energy management device of claim 6, further comprising a memory coupled with said processor and storing a private key, wherein said security module is further operative to retrieve a first public key of a recipient of said outbound communications via said network if not already obtained, said security module is further operative to one of:
 a. encrypt said outbound communications based on said first public key and sign said encrypted outbound communications based on said private key; and
 b. sign said outbound communications with said private key and encrypt said signed outbound communications with said public key; and
further wherein said security module is further operative to retrieve a second public key of a sender of said inbound communication via said network if not already obtained, said security module being further operative to one of:
 c. decrypt said at least one secured inbound communication based on said private key and authenticate said decrypted at least one secured inbound communication based on said second public key; and
 d. authenticate said at least one secured inbound communication based on said second public key and decrypt said authenticated at least one secured inbound communication based on said private key.

9. The energy management device of claim 2, wherein said outbound communications comprises at least one electronic mail message.

10. The energy management device of claim 1, wherein said at least one secured inbound communication is at least signed, said security module further operative to at least one of:
 a. selectively sign said outbound communications; and
 b. authenticate said at least one secured inbound communication.

11. The energy management device of claim 10, wherein said security module is capable of at least one of signing and authenticating using at least one of Pretty Good Privacy ("PGP"), Secure Multipurpose Internet Mail Extensions ("S/MIME"), Extensible Markup Language ("XML") Signature, and Secure Sockets Layers ("SSL") protocols.

12. The energy management device of claim 10, wherein said second energy management data is arranged as a plurality of data sets, each of said data sets including at least one data element, said security module being further operative to selectively sign each of said plurality of data sets.

13. The energy management device of claim 10, wherein said second energy management data comprises a plurality of data elements, said security module being further operative to selectively sign each of said plurality of data elements.

14. The energy management device of claim 10, wherein said security module is further operative to periodically re-authenticate said at least one secured inbound communication after receipt.

15. The energy management device of claim 10, wherein said outbound communications comprises Extensible Hypertext Markup Language ("XHTML") data, said security module further comprising an XHTML module operative to sign said outbound communication using Extensible Markup Language ("XML") signing.

16. The energy management device of claim 10, wherein said security module is further operative to exchange certificates with a sender of the at least one secured communication prior to said signing.

17. The energy management device of claim 1, wherein said at least one secured inbound communication is at least compressed, said security module being further operative to decompress said at least one secured inbound communication after validation thereof.

18. The energy management device of claim 1, wherein said security module is further operative to compress said outbound communications prior to the securing thereof.

19. The energy management device of claim 1, wherein said processor is further operative to generate a first portion of said second energy management data prior to generating a second portion of said second energy management data, said network interface being further operative to generate a first portion of said outbound communications including said first portion of said second energy management data prior to generating a second portion of said outbound communications including said second portion of said second energy management data, and said security module being further operative to secure said first portion of said outbound communications prior to securing said second portion of said outbound communications.

20. The energy management device of claim 19, wherein said network interface is further operative to transmit said secured first portion of said outbound communications independent of transmitting said secured second portion of said outbound communications.

21. The energy management device of claim 1, wherein said network interface is further operative to generate and store said outbound communications when said second energy management data is generated and secure and transmit said outbound communications when said energy management device is not performing said at least one energy management function.

22. The energy management device of claim 1, wherein said secured outbound communications are capable of being received by a first recipient and retransmitted to a subsequent recipient without compromising authentication by said subsequent recipient.

23. The energy management device of claim 22, wherein said first recipient may alter the format of said outbound communications for retransmission and retransmit said reformatted outbound communications to said subsequent recipient without compromising authentication by said subsequent recipient.

24. The energy management device of claim 1, further comprising a memory coupled with said processor, said memory storing a key value and program code executed by said processor to implement said at least one energy management function, said stored program code further being associated with said key value, wherein said processor is further operative to validate said stored program code based on said stored key value.

25. A method of communicating by an energy management device, said energy management device for use in an energy management architecture for managing an energy distribution system, said energy management architecture comprising a network, said method comprising:
    coupling said energy management device with at least a portion of said energy distribution system;
    coupling said energy management device with said network wherein said energy management device is capable of transmitting outbound communications to said network and receiving inbound communications from said network, said inbound communications comprising first energy management data and said outbound communications comprising second energy management data, wherein at least one of said inbound communications comprises at least one secured inbound communication;
    performing at least one energy management function on said at least a portion of said energy distribution system , processing said first energy management data and generating said second energy management data as a function of said energy management function; and
    encrypting, selectively said outbound communications and validating said at least one secured inbound communication.

26. The method of claim 25, wherein said at least one secured inbound communication is at least encrypted, said method further comprising decrypting said at least one secured inbound communication.

27. The method of claim 26, wherein said encrypting and decrypting further comprises using at least one of Secure Multipurpose Internet Mail Extensions ("S/MIME"), Extensible Markup Language ("XML") Encryption, Secure Sockets Layers ("SSL"), and Pretty Good Privacy ("PGP").

28. The method of claim 26, wherein said encrypting further comprises encrypting said outbound communications for decryption only by an intended recipient of said outbound communications.

29. The method of claim 26, wherein said encrypting further comprises selectively encrypting said outbound communications for transmission over a portion of said network.

30. The method of claim 26, wherein said at least one secured inbound communication is further at least signed, said method further comprising at least one of:
    signing, selectively, said encrypted outbound communications;
    signing, selectively, said outbound communications prior to encryption;
    authenticating said at least one secured inbound communication prior to said decrypting; and
    authenticating said at least one secured inbound communication after decryption.

31. The method of claim 30, wherein said signed encrypted outbound communications comprises at least one of a public key, a Public Key Infrastructure ("PKI") certificate, a message digest and an Extensible Markup Language ("XML") signature.

32. The method of claim 30, further comprising at least one of:
    retrieving a first public key of a recipient of said outbound communications via said network if not already obtained;
    encrypting said outbound communications based on said first public key and signing said encrypted outbound communications based on a stored private key;
    signing said outbound communications based on said stored private key and encrypting said signed outbound communications based on said first public key;
    retrieving a second public key of a sender of said inbound communication via said network if not already obtained;
    decrypting said inbound communication based on said second public key and authenticating said decrypted inbound communication based on said stored private key; and
    authenticating said inbound communication based on said stored private key and decrypting said authenticated inbound communication based on said second public key.

33. The method of claim 26, wherein said outbound communications comprises at least one electronic mail message.

34. The method of claim 25, wherein said at least one secured inbound communication is at least signed, said method further comprising at least one of:
    signing, selectively, said outbound communications; and
    authenticating said at least one secured inbound communication.

35. The method of claim 34, wherein said signing and authenticating further comprise signing and authenticating using at least one of Pretty Good Privacy ("PGP"), Secure Multipurpose Internet Mail Extensions ("S/MIME"), Extensible Markup Language ("XML") Signature, and Secure Sockets Layers ("SSL").

36. The method of claim 34, wherein said second energy management data is arranged as a plurality of data sets, each of said data sets including at least one data element, said method further comprising:
    signing, selectively, each of said plurality of data sets.

37. The method of claim 34, wherein said second energy management data comprises a plurality of data elements, said method further comprising:
  signing, selectively, each of said plurality of data elements.

38. The method of claim 34, wherein said outbound communications comprises Extensible Hypertext Markup Language ("XHTML") data, said method further comprising signing said outbound communications using Extensible Markup Language ("XML") signing.

39. The method of claim 34, further comprising:
  re-authenticating, periodically, said at least one secured inbound communication.

40. The method of claim 34 further comprising:
  exchanging certificates with a sender of the at least one secured communication prior to said signing.

41. The method of claim 25, wherein said at least one secured inbound communication is at least compressed, said method further comprising decompressing said at least one secured inbound communication after validation thereof.

42. The method of claim 25, said method further comprising compressing said outbound communications prior to the securing thereof.

43. The method of claim 25, said method further comprising:
  generating a first portion of said second energy management data prior to generating a second portion of said second energy management data;
  generating a first portion of said outbound communications including said first portion of said second energy management data prior to generating a second portion of said outbound communications including said second portion of said second energy management data; and
  securing said first portion of said outbound communications prior to securing said second portion of said outbound communications.

44. The method of claim 43, said method further comprising transmitting said secured first portion of said outbound communications independent of transmitting said secured second portion of said outbound communications.

45. The method of claim 25, said method further comprising generating and storing said outbound communications when said second energy management data is generated and securing and transmitting said outbound communications when said energy management device is not performing said at least one energy management function.

46. The method of claim 25, wherein said secured outbound communications are capable of being received by a first recipient and retransmitted to a subsequent recipient without compromising authentication by said subsequent recipient.

47. The method of claim 46, further comprising:
  altering the format of said outbound communications by said first recipient for retransmission and retransmitting said reformatted outbound communications to said subsequent recipient without compromising authentication by said subsequent recipient.

48. The method of claim 25, further comprising
  storing a key value;
  storing program code associated with said key value and executable to implement said at least one energy management function;
  validating, periodically, said stored program code based on said stored key value.

49. An energy management device for use in an energy management architecture for managing an energy distribution system, said energy management architecture comprising a network, said energy management device comprising:
  an energy distribution system interface means for coupling said energy management device with at least a portion of said energy distribution system;
  a network interface means for coupling said energy management device with said network for transmitting outbound communications to said network and receiving inbound communications from said network, said inbound communications comprising first energy management data and said outbound communications comprising second energy management data;
  a processor means, coupled with said network interface and said energy distribution system interface, for performing at least one energy management function on said at least a portion of said energy distribution system via said energy distribution system interface, processing said first energy management data and generating said second energy management data as a function of said energy management function;
  wherein at least one of said inbound communications comprises at least one secured inbound communications, said network interface means further comprising a security module means for securing said outbound communications and validating said at least one secured inbound communication.

* * * * *

UNITED STATES PATENT AND TRADEMARK OFFICE
CERTIFICATE OF CORRECTION

| | | |
|---|---|---|
| PATENT NO. | : 7,188,003 B2 | Page 1 of 1 |
| APPLICATION NO. | : 10/752467 | |
| DATED | : March 6, 2007 | |
| INVENTOR(S) | : Douglas S. Ransom et al. | |

It is certified that error appears in the above-identified patent and that said Letters Patent is hereby corrected as shown below:

On the Title Page

Page 2, in column 2, line 39, delete "iModern" and substitute --iModem-- in its place.

Signed and Sealed this

Fifth Day of June, 2007

JON W. DUDAS
*Director of the United States Patent and Trademark Office*